(12) United States Patent
Kuang et al.

(10) Patent No.: US 7,162,706 B2
(45) Date of Patent: Jan. 9, 2007

(54) METHOD FOR ANALYZING AND VALIDATING CLOCK INTEGRATION PROPERTIES IN CIRCUIT SYSTEMS

(75) Inventors: Ser-Hou Kuang, San Jose, CA (US); Sean Kevin Murphy, San Jose, CA (US)

(73) Assignee: PicoCraft Design Systems, Inc., San Jose, CA (US)

( * ) Notice: Subject to any disclaimer, the term of this patent is extended or adjusted under 35 U.S.C. 154(b) by 260 days.

(21) Appl. No.: 10/794,240

(22) Filed: Mar. 5, 2004

(65) Prior Publication Data

US 2005/0198601 A1 Sep. 8, 2005

(51) Int. Cl.
*G06F 17/50* (2006.01)

(52) U.S. Cl. ............... 716/6; 716/4; 716/5; 716/18

(58) Field of Classification Search ......... 716/4–6, 716/18
See application file for complete search history.

(56) References Cited

U.S. PATENT DOCUMENTS

| 6,173,435 | B1* | 1/2001 | Dupenloup | 716/18 |
| 6,205,572 | B1* | 3/2001 | Dupenloup | 716/5 |
| 7,032,198 | B1* | 4/2006 | Sano et al. | 716/5 |
| 2004/0128634 | A1* | 7/2004 | Johnson et al. | 716/6 |
| 2004/0225978 | A1* | 11/2004 | Fan et al. | 716/6 |

* cited by examiner

*Primary Examiner*—Paul Dinh
(74) *Attorney, Agent, or Firm*—Buchanan Ingersoll & Rooney

(57) ABSTRACT

A method for analyzing and validating clock integration properties in a circuit design is disclosed. A database of timing points that are clocked cell elements of the circuit design is generated. Next, a timing point frame showing the interaction of the clocked cell elements and the non-clocked cell elements is generated. The timing point frame graphically shows the timing network properties for the cell elements of the circuit design. A clock analysis view can be generated from the timing point frame for selected timing points. In this respect, the timing point frame shows timing points that meet a prescribed criteria (e.g., same clock domain). Therefore, the clock analysis view provides a graphical representation of timing and clock interactions for the circuit design.

45 Claims, 17 Drawing Sheets

FIG 2 (Current Art)

FIG 3 (Current Art)

METHOD FOR ANALYZING AND VALIDATING CLOCK INTEGRATION PROPERTIES IN CIRCUIT SYSTEMS

FIELD OF THE INVENTION

The present invention generally relates to timing and functional analysis in circuit designs and more specifically to a method for visually representing timing and clock relationships between circuit elements of an integrated circuit whereby graphical views of clock interactions are presented to a designer for further evaluation.

BACKGROUND OF THE INVENTION

The development of Very Large Scale Integrated (VLSI) chips can be divided into two broad design phases: logical (or front end) and physical (or back end). The logical design phase deals primarily with the functional aspects of the VLSI chip, while the physical design phase focuses on implementing the chip. A chip designer in the logical design phase typically starts with a high level specification and refines it through a number of levels of abstraction. The chip is then implemented in the physical design phase. The designer is careful to maintain functional equivalence between successive levels of specification, and analyzes and verifies that each lower level specification, with its added implementation details, satisfies the design objectives defined for the chip.

FIG. 1 outlines the different levels of design specification for a typical VLSI chip. A functional behavioral specification 30 defines the functional behavior of the system and describes how the system responds to external inputs. This level of specification implies little about the physical implementation of the chip. A register transfer level (RTL) specification 32 defines the system functionality with clocking explicit and accurate cycle-by-cycle. A logical gate level netlist specification 34 details system functionality thereby making all of the cell elements that implement the system and their connectivity explicit. A physical gate level netlist specification 36 is functionally equivalent to the logical gate level netlist specification 34 but with a re-partitioned design hierarchy and cell selections that are more likely to satisfy backend physical constraints and the desired chip operating speed. A GDSII mask level specification 38 defines the actual layout geometries (e.g. polygons and paths) that implement the chip.

With advances in silicon process technology, more and more circuit functionality that was previously implemented in separate silicon devices is now integrated into a single silicon chip. The benefits of this System-On-Chip (SOC) approach to VLSI designs are obvious—lower system cost, lower power consumption, and higher operating speeds.

But the highly integrated nature of SOC designs present many challenges to development teams. SOC designs normally contain a large number of functional design blocks. The blocks can be legacy blocks inherited from previous projects, intellectual property (IP) blocks purchased from third party suppliers, or new blocks designed in-house. Each functional block may have one or more operating clocks and may be designed to run at different frequencies. It is not uncommon to have a large number of different operating clock domains in a SOC design.

As the design specification is refined during the physical design phase, the impact of layout interactions and constraints on chip performance become clearer. The designer may not only re-partition the functional hierarchy from the logical design phase but may also substitute or transform basic cell elements to better satisfy the performance objectives of the chip. These changes, although they should leave the circuit functionally equivalent to its logical design phase specification, may re-arrange or even disperse clock domains that were once local thereby resulting in additional delays that can directly impact both effective clock operating frequencies and clock domain interactions.

Analyzing the impact of these physical design phase specification refinements and validating that the chip will still meet performance objectives is greatly complicated in both VLSI and SOC chips due to their typically high clock counts. It's not enough to simply validate each clock, a problem that scales linearly with the clock count, but the designer must also validate clock domain interactions across all of the distinct operating conditions and test modes of the chip. This is a challenge that has exponentially increasing complexity with the number of distinct clock domains increasing. Generally, clock interaction verification is performed by leveraging other analysis steps in three different levels of specification; (1) register transfer level (RTL), (2) logical gate level netlist and (3) physical gate level netlist.

FIG. 2 shows a block diagram of a typical functional simulation process for clock interaction verification. Functional simulation addresses the functional behavior of the design and is typically applied to either the register transfer level (RTL) or the logical gate level netlist. Furthermore, functional simulation evaluates how the design responds to a pre-defined input stimulus and compares the response to an expected behavior. Functional simulation can also be used to check the correctness of basic clock behavior and clock interactions. Referring to FIG. 2, a simulation test bench 50 is an input stimulus set-up for the functional simulation and drives the functional simulation process. A design specification 52 defines the functional description of the design and can be either the register transfer level (RTL) design files 54 or the logical gate level netlist files 56. Simulation model files 58 define the functional simulation models for all the cell elements in the gate level netlist specification including primitive cells and special blocks such as memory. Configuration files 60 are set-up files specific to the functional simulation software program. The functional simulation 62 is the functional simulation software program, while simulation output files 64 are the results from the functional simulation analysis runs whereby clock interaction signals can be observed, tracked and analyzed. Run-time log files 66 report the status and errors of the simulation throughout the entire analysis runs.

Functional simulation is a dynamic analysis tool with results that are stimulus dependent. The completeness or coverage of the analysis is dependent upon the completeness of the stimulus input data. If functional simulation is the only method employed to analyze clock interactions, it is possible that all required checks for all relevant scenarios may not be performed. In addition, selecting all of the appropriate probe points to correctly observe the interaction between clock domains in the functional simulation is extremely challenging. An error may be missed even if a complete set of stimulus vectors are offered.

FIG. 3 shows a block diagram of a static timing analysis process for clock interaction verification. Static timing analysis can be performed on either logical or physical gate level netlist specifications. It traverses through the physical connectivity of the design and reports the longest and shortest path delays originating from defined clock sources.

General clock interaction connectivity can be derived and checked by checking each path that crosses the clock domain.

Referring to FIG. 3, timing constraint and exception files 80 define the path exception and timing constraints for the static timing analysis runs. The path exception includes multiple-cycle paths and false paths. Input design specification files 82 are the gate level netlist files for the timing analysis run. The files 82 can be either logical gate level netlist files 56 or physical gate level netlist files 86. Timing model files 88 contain the timing attributes for all the cell elements including memory in the gate level netlist specification. The timing attributes include delay transition arcs, delay values, timing constraints, clocking pins, storage type such as flop or latch, and the cell's functional expression. These timing attributes are the basis for describing the timing behavior of each cell element and are needed in the static timing analysis process. Run-time control files 90 contain software tool specific data for controlling the run-time behavior of the static timing analysis software program. Static timing analysis 92 is the actual static timing analysis software program used in the simulation. Interconnect parasitic files 94 are used for a physical gate level netlist and contain the parasitic capacitances and resistances of all the interconnect nets in the design. The parasitic data is extracted from the design layout. Delay annotation files 96 contain the delay data of all the nets and cells in the design. This is only needed when a net delay calculation is performed outside the static timing analysis software program. Timing analysis report files 98 are the main analysis output and include the longest and shortest path delays and their slack times in terms of meeting the timing constraints. The run-time log files 100 report the errors and informative status tracking of the static timing analysis runs.

There are key limiting factors to the usefulness of static timing analysis. The size and complexity of the SOC designs often require an enormous amount of computing resources and generate large volumes of output data in the static timing analysis process. This is especially the case when analyzing clock interactions where all of the relevant paths crossing clock domains need to be separately identified and analyzed.

Another method in the current art for design analysis is a pure RTL based analytical method that analyzes the RTL specification and the clock domains assigned to the RTL elements. No detailed timing is evaluated because this is a pre-synthesis technique that doesn't have access to the detailed timing in the gate level netlist. But clocks and clock domain interactions can be inferred and some simple synchronization analysis can be applied. A drawback to this technique is its very limited analytic utility and lacking access to the physical structure and detailed timing information about the circuit.

In VLSI chips and especially in SOC there is a need to identify and verify the clock interaction in various operating modes completely and correctly. The current state of the art is a combination of functional simulation and static timing analysis. Each method is limited by a lack of completeness and an inability to handle design size and complexity. Furthermore, in the current state of the art, either the correct stimulus and probe points, or the correct paths for the analysis must be identified to be accurate and thorough.

SUMMARY OF THE INVENTION

The invention disclosed herein comprises a process for abstracting the key timing and clocking properties from a gate level netlist specification. Furthermore, the present invention provides an associated design representation to enable a designer to visualize the timing points and their relationships in a design. The present invention further provides a process to further abstract timing point relationships into clock domains and provide a model of their interaction. A second related design representation that provides a succinct visual representation of clock domain interactions for a VLSI or even SOC level design can also be generated.

The process of the present invention creates a level of clock analysis design representation in an environment where all clock interactions across relevant operating conditions and test modes can be effectively and efficiently identified and checked. The process allows a top-down analysis framework referencing to underlying timing points and cell elements.

The first level of design representation, according to the present invention, consists of multiple timing point frames where each timing point frame is a collection of connected timing points or symbols. A timing point is a representational view of a clocked cell element from the gate level netlist specification. The timing points are generated by analyzing the timing network and clock attributes of the circuit elements for the selected circuit design. Within each timing point frame, the non-clocked cells between timing points are selectively collapsed (or abstracted) into attribute references based upon a set of connection rules. Relationships between timing points are captured by directed timing point arcs and attributes to reduce the design into a compact representation suitable for visualization. The timing point arcs can be considered interconnections or interconnecting symbols. Connection rules (i.e., the timing point connection rules) are defined in such a manner as to allow each timing point frame to correspond to an operating mode of the design. The timing points are analyzed by the timing point connection rule in order to link the timing points according to the selected operating mode. For instance, a timing point frame can correspond to a normal functional mode, a test scan mode, etc . . . .

The second level of design representation is achieved by grouping the timing points and timing point connections in each timing point frame according to a variety of criteria for example by a clock analysis rule that specifies a common criteria. For example timing point symbols can be condensed into a group of timing point symbols. A timing point frame can generate multiple representations of a clock analysis view. For example, for a grouping based solely on a clock analysis rule that specifies common clock domains, the resulting clock analysis view will consist of groups of timing points in the same clock domain. The interaction between clock domains is derived from all the timing point arcs at the group boundary, and can be further collapsed into a single group arc representation. For example, interconnections or interconnecting symbols from the timing point frame can be collapsed into grouped interconnections or interconnection symbols. The attributes associated with a group arc provide link references to the underlying timing point arcs and their timing points, which in turn can refer to the cell elements in the gate level netlist specification. This provides an analysis framework of hierarchical link references. Clock interaction properties such as valid clocking rules and clock synchronization rules can be identified and checked.

The present invention provides a number of key advantages over current functional and static timing analysis tools by having improved capacity. Specifically, the present invention consumes less memory and runtime than current methods for the same design. Both the timing point frame and the clock analysis view are condensed representations as compared to a full gate level netlist specification. Accordingly, for a computer's given processing speed and memory capacity, larger designs can be analyzed on the same schedule as the current timing analysis tools. As such, the present invention can be used to analyze an entire chip at once, as opposed to partial designs.

The present invention also provides thorough analysis with little user guidance thereby significantly reducing the risk that an error in the timing and clocking specification of the design will escape the designer's notice. The present invention does not require the designer to specify input stimulus as is required for a functional simulation. The static nature of path traversal used in collapsing non-clocked cells during the construction of the timing point frame in the present invention ensures path completeness and is further abstracted into the clock analysis view.

A succinct visual representation of clock and timing point interactions are provided by the present invention for the first time. The clock analysis view provides the designer with a succinct representation not only to visualize the complete set of high level clock interactions, but also to review and communicate them. The timing point frames provide a detailed view equivalent to a schematic that highlights the detailed clock interactions, and provides a detailed or expanded view for any clock domain interactions that a designer wants to further analyze. Prior art methods for representing clock domain interactions are either indented lists where each clock is followed by a list of the domains that interact. Alternatively, a prior art method is to use a matrix to show clock domain interactions. The matrix view is typically sparse where rows and columns are clock domains and their interaction is the value where the row and column intersect. In the matrix view, the diagonal is the interaction of a clock domain with itself. Either of these prior art methods make discerning patterns or validating interactions very hard if you have more than a dozen clock domains.

The present invention also provides a fast comparison of design revisions based on the invariant property of the timing point frame and clock analysis view. The topology of timing point frame is invariant at a chip level with respect to changes in synthesis parameters or floorplan partitions. A comparison of two versions of timing point frames between design iterations can quickly alert the designer to possible significant changes in design functionality. This test runs substantially faster than other methods that compare the RTL specification to the gate level netlists or comparison tools that compare the physical gate level netlist to the logical gate level netlist.

VLSI chip development is an iterative process. The design goal is to progressively converge toward the functional correctness and targeted implementation requirements. The clock interaction verification process of the present invention can be used in the iterative design process to refine and fix detected functional and performance errors.

Referring to FIG. 4, the process of using the present invention in the design process of FIG. 1 is shown. FIG. 4 illustrates the iterative flow for clock interaction verification across various levels of the design specification. In FIG. 4, block 120 represents two parts of the iterative flow in the design process. The first part is the process of clock interaction verification employing the present invention. The second part illustrates feedback and design fixes that act upon the verification results. The clock interaction verification process works from either the logical or the physical gate level specification as shown as input to block 120.

In general, there are two types of errors that can be detected in the clock interaction verification process: (1) functional errors and (2) performance errors. Functional errors are failures due to incorrect functionality, for example missing synchronizers or incorrect net connections. Performance errors are failures due to the incorrect performance in the implementation, for example long timing delays across a connected net.

In FIG. 4, directional arrow 122 collectively represents all the feedback actions for fixing the detected errors by the designer. Typically, the fixes for functional errors involve changing the design specification in either the functional behavior specification 30 or the register transfer level (RTL) specification 32. The fixes for performance errors typically involve modifying the design environments in order to generate a better logical gate level netlist specification 34 or physical gate level netlist specification 36. For example, an error due to long timing delays can be fixed by changing the floorplan to produce a better layout partition in the physical gate level netlist specification 36. If no clock interaction errors are detected, the development flow continues into the next level of implementation.

BRIEF DESCRIPTION OF THE DRAWINGS

These as well as other features of the present invention will become more apparent upon reference to the drawings wherein.

DETAILED DESCRIPTION

Figure 6:
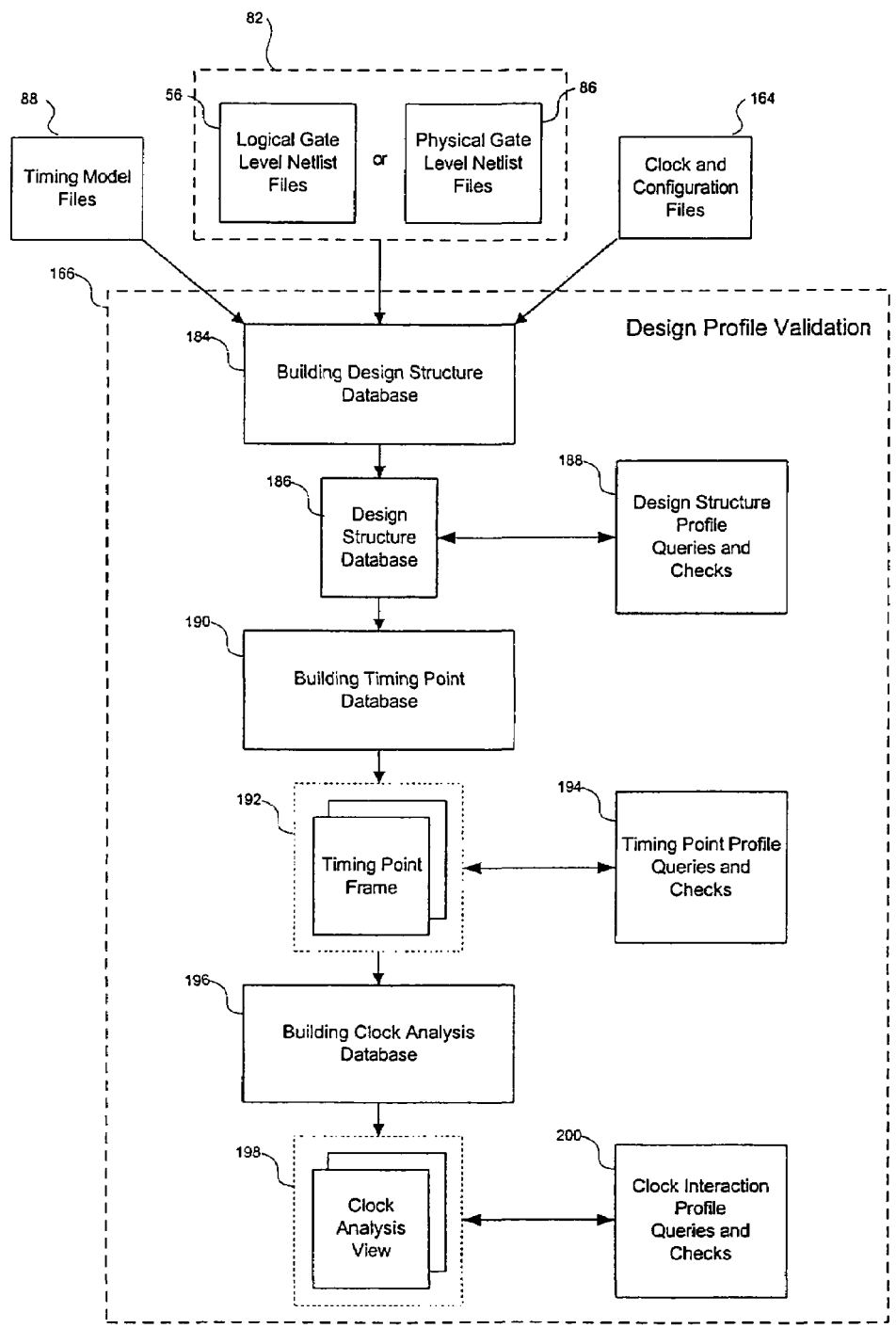
FIG. 6 is a block diagram showing the design profile validation of the present invention.

Various aspects will now be described in connection with exemplary embodiments including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described. The instructions of a computer program for providing a design profile validation as illustrated in FIG. 6 can be embodied in any computer readable medium for use by or in connection with an instruction execution system, apparatus, or device, such as a computer based system, processor containing system, or other system that can fetch instructions from the instruction execution system, apparatus, or device and execute the instructions.

Figure 5:
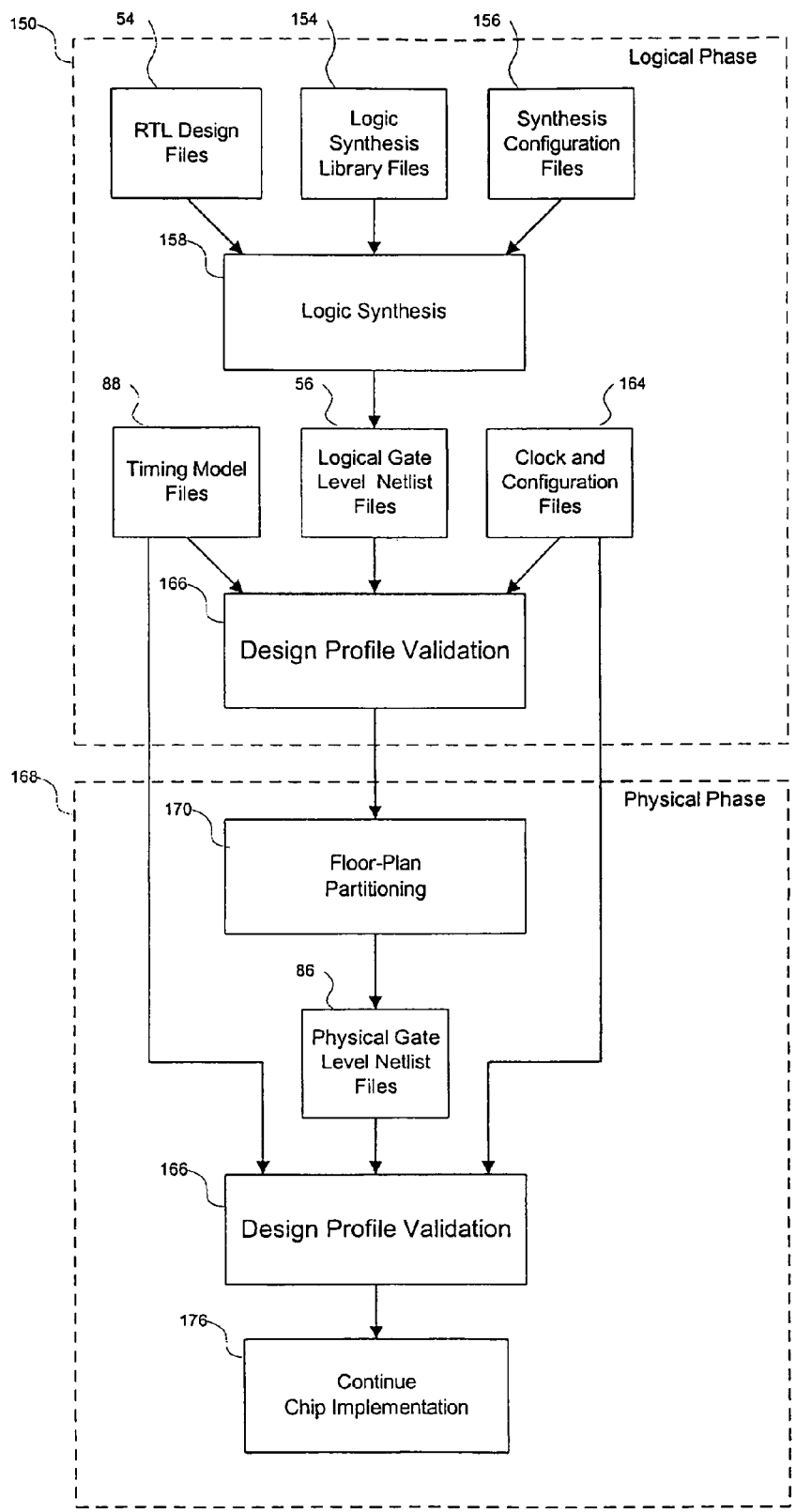
FIG. 5 is a block diagram showing a design profile validation process in both the logical and the physical design phases.

Referring now to the drawings wherein the showings are for purposes of illustrating preferred embodiments of the present invention only and not for purposes of limiting the same, FIG. 5 shows the design flow for interfacing logical and physical design phases. It is possible to implement the design profile validation of the present invention using either the logical gate level netlist specification or the physical gate level netlist specification.

The design profile validation process block 166 evaluates the general design profile to determine the implementation quality of the gate level netlist specification, and to support queries and rule checking for design analysis and verification. Clock interaction verification is also part of this function. More specific details of the design profile validation are described later.

The logical design phase block 150 in FIG. 5 represents a simplified view of the logical design phase and illustrates transforming the register transfer level (RTL) specification into the logical gate level netlist specification using logic synthesis 158 and the design profile validation block 166. In the logical design phase block 150, the RTL design files 54 are the same input data as used in the functional simulation and are the register transfer level (RTL) specification of the design. In order to simplify the illustration in FIG. 5, only two main input data for the logic synthesis 158 process are shown. These are the logic synthesis library files 154 and the synthesis configuration files 154.

The logic synthesis library files 154 are the target synthesis cell library. These are the basic cell elements to be used to implement the resulting logical gate level netlist files 56. The logic synthesis library files 154 contain implementation attributes such as functionality, timing and layout areas for all the basic cell elements.

Figure 1:
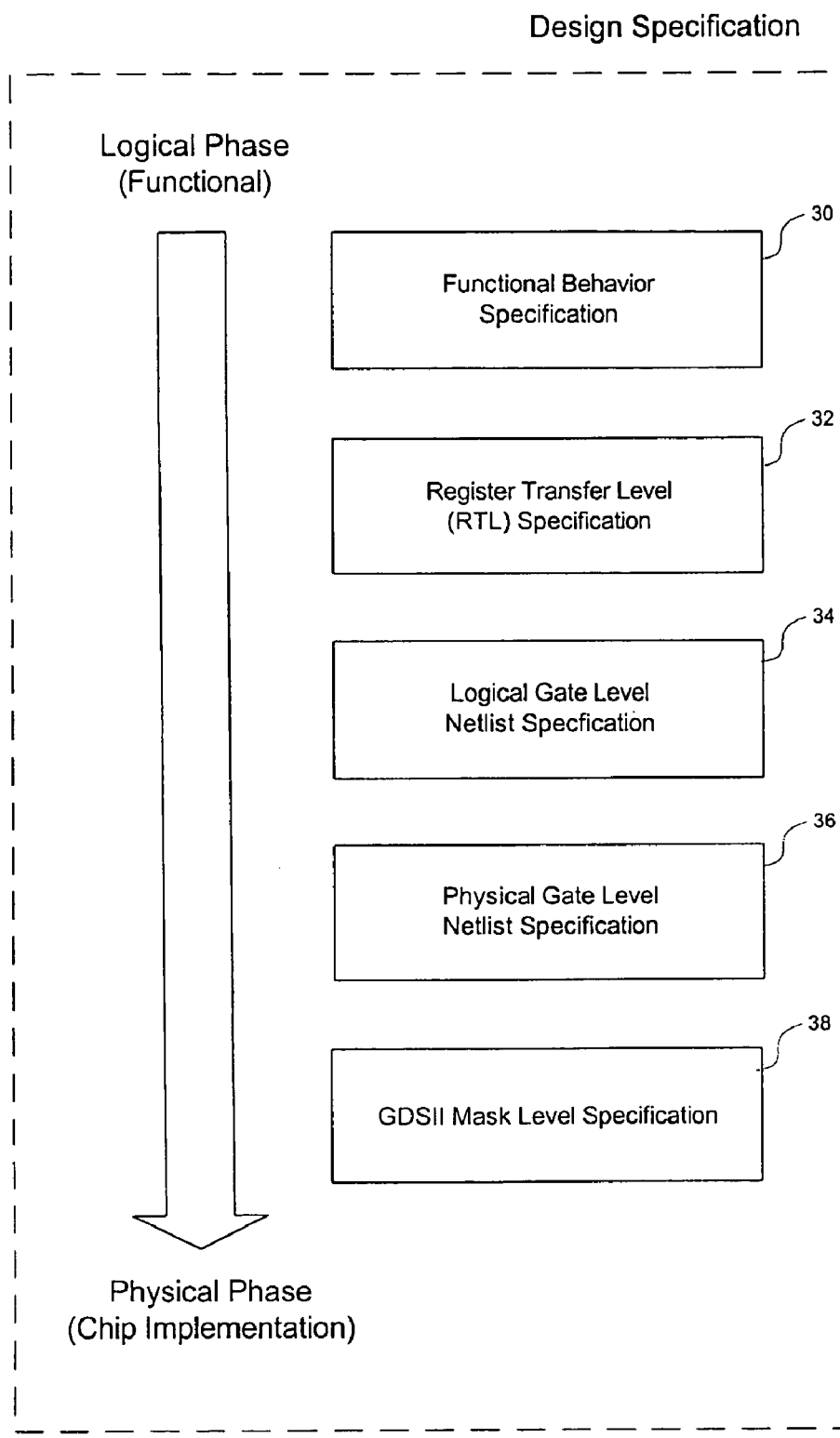
FIG. 1 is a block diagram showing the different levels of design specifications from the logical design phase into the physical design phase.
Figure 2:
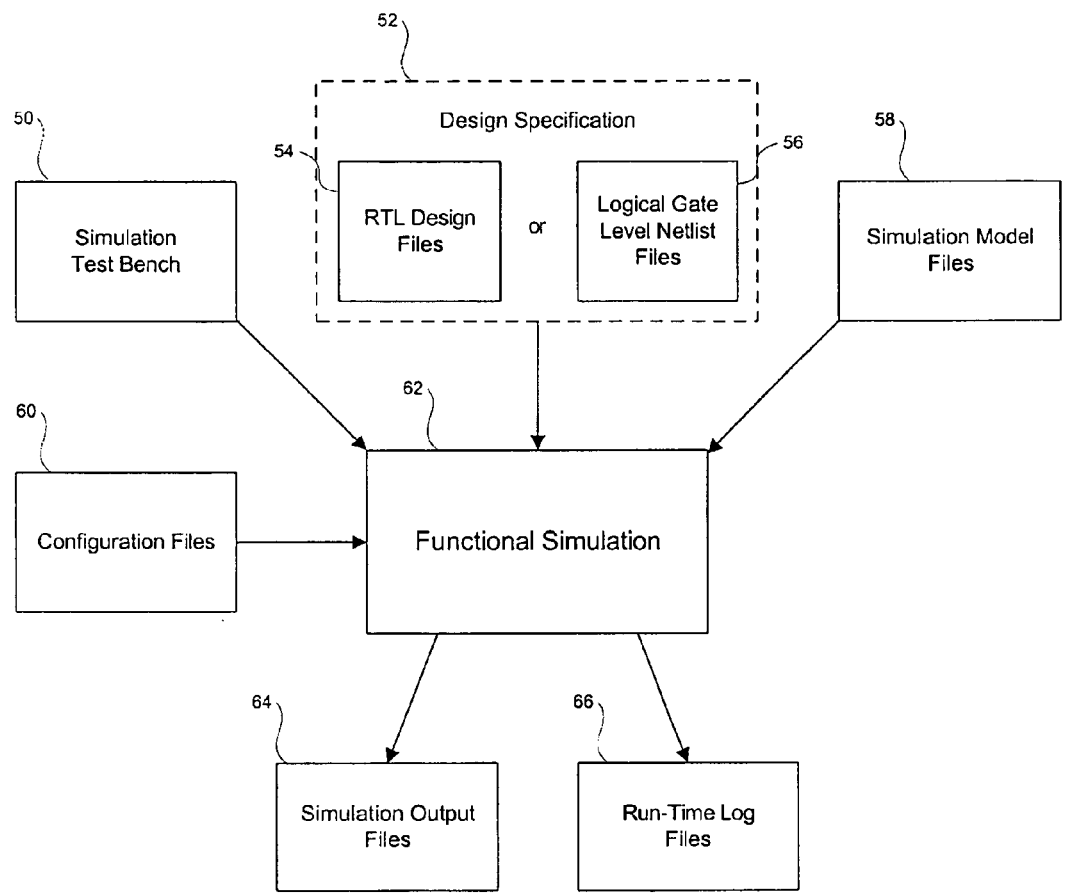
FIG. 2 is a block diagram showing the current art of a typical functional simulation.
Figure 3:
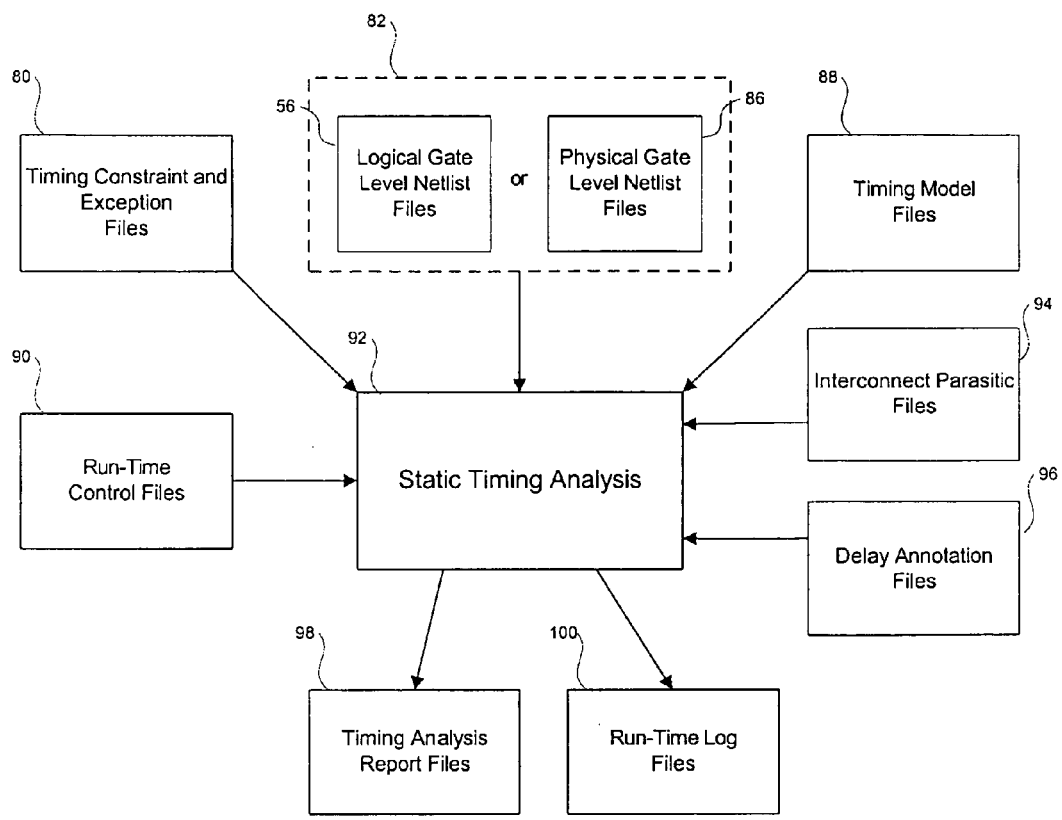
FIG. 3 is a block diagram showing the current art of a typical static timing analysis.
Figure 4:
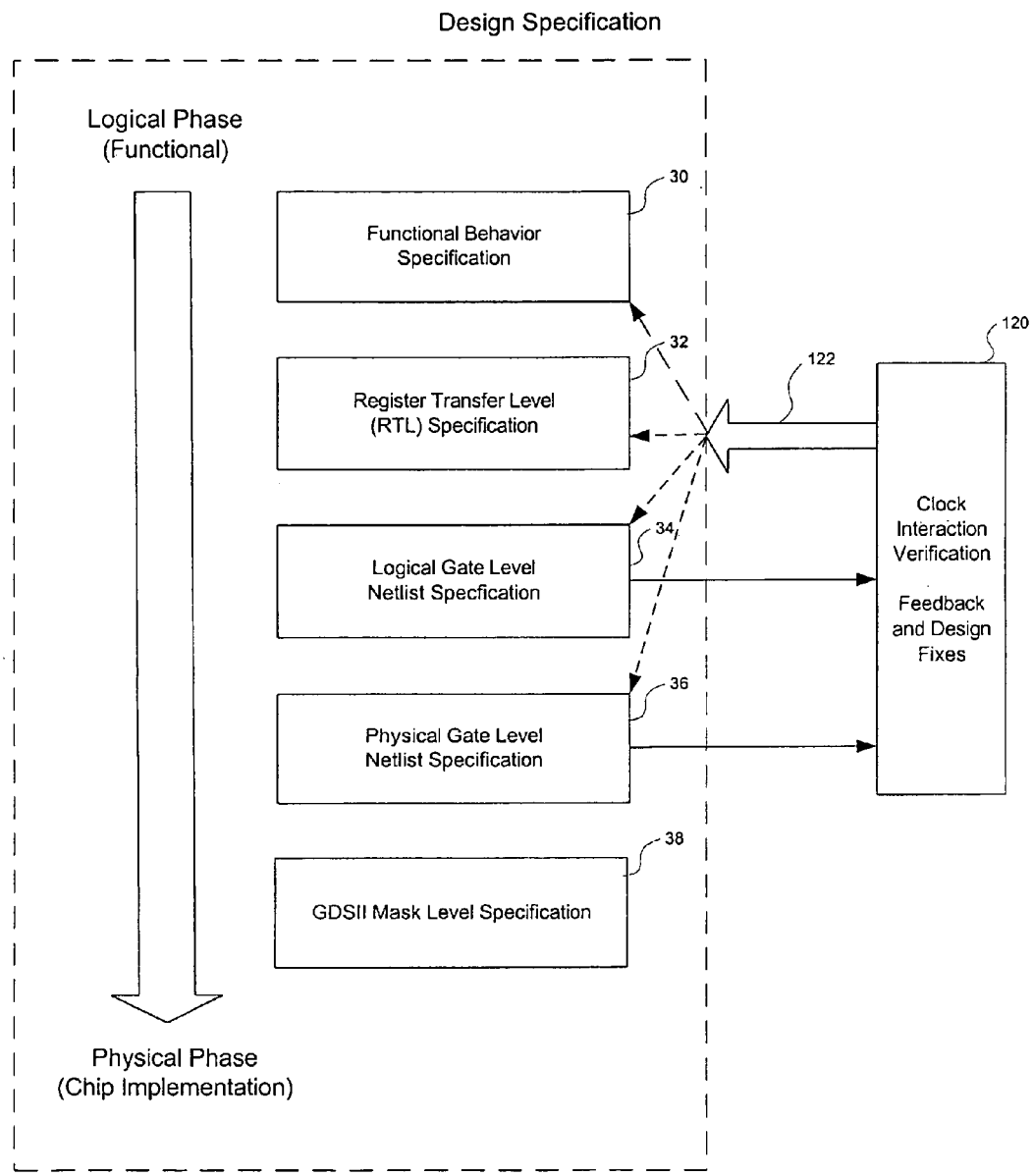
FIG. 4 is a block diagram illustrating an iterative process for clock interaction verification of the present invention.

The synthesis configuration files 156 contain the set up, constraints and run time configurations needed to make the logic synthesis runs. The logic synthesis block 158 is the logic synthesis software program that carries out the logic synthesis function. The output of logic synthesis block 158 is the logical gate level netlist files 56. This logical gate level netlist specification is the same as the input to the static timing analysis in FIG. 3.

The timing model files 88, the clock and configuration files 164, and the logical gate level netlist files 56 are the main input data shown in FIG. 5 for the design profile validation block 166. The timing model files 88 contain the timing delay attributes of all cell elements including special memory. The timing model files 88 are the same files used in a typical static timing analysis 92 shown in FIG. 3. The clock and configuration files 164 are the design clock definitions and runtime control commands.

The physical design phase 168 begins after the design profile validation has been performed by block 166 in the logical design phase 150. During the physical design phase 168, the logical gate level netlist specification is transformed into the physical gate level netlist specification.

The logical gate level netlist files 56 are inputted into the physical design phase 168 as the design specification. Floor-plan partitioning block 170 is the software program that manipulates all the design elements and hierarchies in the design specification in order to meet backend physical constraints and the target operating speeds. The floor-plan partitioning block 170 transforms the logical gate level netlist files 56 into the corresponding physical gate level netlist files 86. It will be recognized that other input data files can be used by the floor-plan partitioning block 170 in order to generate the physical gate level netlist files 86.

The design profile validation block 166 is the same in the logical design phase 150 and in the physical design phase 168. However, the design profile validation block 166 operates on two different netlist specifications in each phase. The design profile validation block 166 in the logical design phase 150 is operating on the logical gate level netlist files 56, while the design profile validation block 166 in the physical design phase 168 is operating on the physical gate level netlist files 86.

Referring to FIG. 6, the internal block structure of the design profile validation block 166 is shown. There are three main input files to the design profile validation block 166: (1) the timing model files 88, (2) the logical gate level netlist files 56 or the physical gate level netlist files 86, and (3) the clock and configuration files 164. In order to simplify the diagram, other auxiliary supporting data files to the design profile validation block 166 have not been shown.

Design profile validation block 166 contains three consecutive processing stages. Each processing stage builds an appropriate in-core memory database for the level of design profile queries and checks suitable at that stage. The first processing stage 184 builds the design structure database 186. The purpose is to construct an in-memory design structure database 186 for the cell connectivity with structural profile attributes from external data files. The structural profile attributes are in three classes the connectivity attributes (such as net fanout, fanin, combinatorial loop and latch loop), the clocking attributes (such as clocked cells and clocking domains, clock tree and clock gating) and the timing attributes (such as arrival delay times to cell pins from clocks). The design structure database 186 supports the subsequent processing stages. The input gate level netlist specification can either be the logical gate level netlist files 56 or the physical gate level netlist files 86, depending on when the design profile validation block 166 is invoked. Other main input data are the timing model files 88 and the clock and configuration files 164. The design structure profile queries and checks block 188 operates in conjunction with the design structure database 186 and provides a means to verify various structural profile attributes by ways of queries and checks.

The next step in the processing stage is to build a collection of timing point frames 192 in step 190. The timing point frames 192 serve as a design representation and basis for subsequent clock interaction analysis. All of the individual timing point frames co-exist independently in the in-core memory database and are indexed for later reference. Each timing point frame 192 is a collapsed reference extracted from the design structure database 186 and can be selected one at a time by the timing point profile queries and checks block 194.

A timing point is extracted and derived from the clocked cell element in the database based upon a set of timing point connection rules. The connectivity between timing points is collapsed into timing point arcs with a set of evaluated attributes. The attributes are crucial in preserving the characteristics in the level of representation. For example, the attributes can be the minimum and maximum level of cells or delays between timing points, or the various logical cone properties such as fanin and fanout cone sizes. The timing point profile queries and checks block 194 provides the necessary mechanism for query and check on the timing points and their attributes within the selected timing point frame context.

In step 196, a clock analysis database 196 is built, as well as a collection of clock analysis views 198, for a single selected timing point frame. Each clock analysis view 198 consists of a number of timing point groups. Each group is a collection of timing points constructed by certain grouping rules. During the grouping of timing points, all timing point arcs in the same direction at the timing point group boundary are combined into a single directional group arc with inherited attributes derived from the timing point arcs. This allows the interaction between the timing point groups to be clearly identified and subsequently analyzed within the full design context. A clock interaction profile queries and checks block 200 provides the necessary mechanism for query and checks on interaction attributes of a selected clock analysis view 198.

Figure 7:
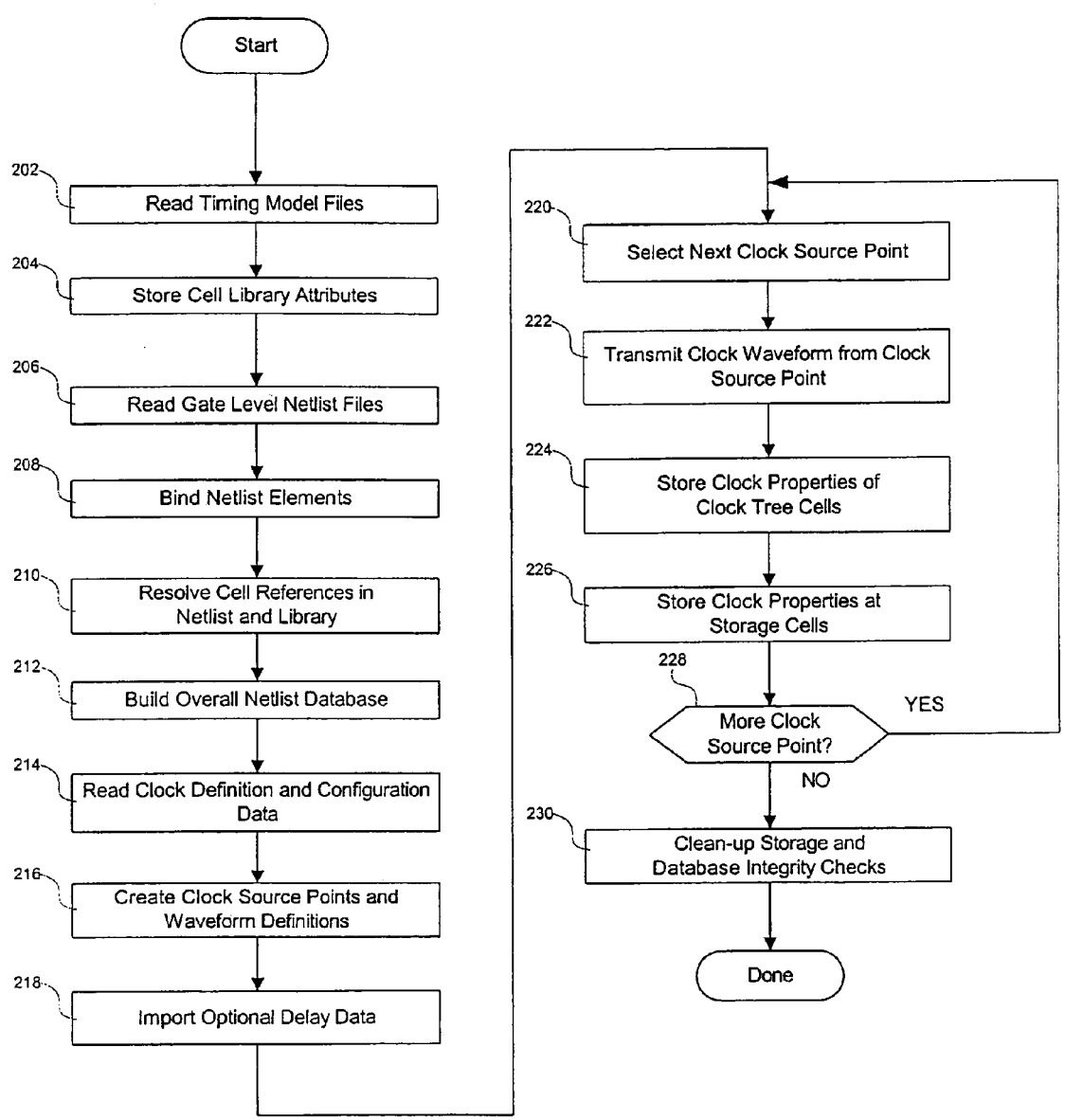
FIG. 7 is a flowchart showing a step-by-step process of building a design structure database in the design profile validation.

Referring to FIG. 7, the process for building the design structure database 186 in step 184 of FIG. 6 is shown. In step 202, one or more of the timing model files 88 are read. All cells specified in the timing model files 88 (including memory elements) are treated as primitive cells where the gate level netlist specification can legitimately make reference. Next, in step 204, the timing attributes of all cells (including memory elements) are extracted and stored in an appropriate memory structure.

With the timing attributes of primitive cells constructed, in step 206, one or more gate level netlist files 82 are read. Logical gate level netlist files 56 or physical gate level netlist files 86 are processed in a similar way. After reading in the appropriate gate level netlist specification, a binding process is initiated in step 208 to check and ensure all hierarchical references are properly resolved. Cell references are then checked in step 210 against the primitive cells extracted from the timing model files 88. If no errors are found, the overall netlist database is allocated and built in step 212.

Steps 214 and 216 read the clock definition and configuration data files 164, and build the storage space for all the clock definitions and clocking attributes such as cycle time, rise and fall edges. The originating sources of the clocks are also identified and checked. The clocking attributes are later used to propagate the clock signals throughout the entire design.

In step 218, optional auxiliary delay data files are read. These files contain the internal timing delays of the cells and nets in the design, and are used in evaluating the delay paths transmitted from the clock sources in traversing the design. The auxiliary delay data files are typically used in the physical design phase when more accurate delays are computed from the physical layouts.

The traversal for all clock signals from the defined clock sources are iterated in steps 220, 222, 224, 226 and 228. Each clock signal is propagated independently through the cells and nets in the design. The clock signal traversed before reaching the very first clocked cell (such as flop, latch or memory element) defines the bound of its clock tree. The clocking attributes and timing attributes are evaluated during the traversal and are stored with the appropriate cell or net elements in the database 186. In step 230, all working storage space is cleaned up and the corresponding design structure database 186 has been successfully built. The completed design structure database 186 contains cell connectivity and structural profile attributes for the entire design. As previously described, structural profile attributes attached to the database 186 consist of three classes of attributes, namely connectivity, clocking and timing attributes.

Before proceeding into the description of generating the timing point database 190, it is necessary to describe the timing point definition and connection rules in more detail. The timing point is defined as any cell in the design with a clock pin. The clock pin is specified as a pin attribute in the timing model files 88. Hence timing points can include many cell types used to implement storage elements in digital systems such as register cells, latch cells and memory cells.

The external ports of the design can be treated as clocked cell elements. Accordingly, timing points can be derived for the external ports. This typically occurs when the external ports have been defined with arriving signals and delays from particular clock domains, or have delays propagated from the defined clock domains.

Figure 8:
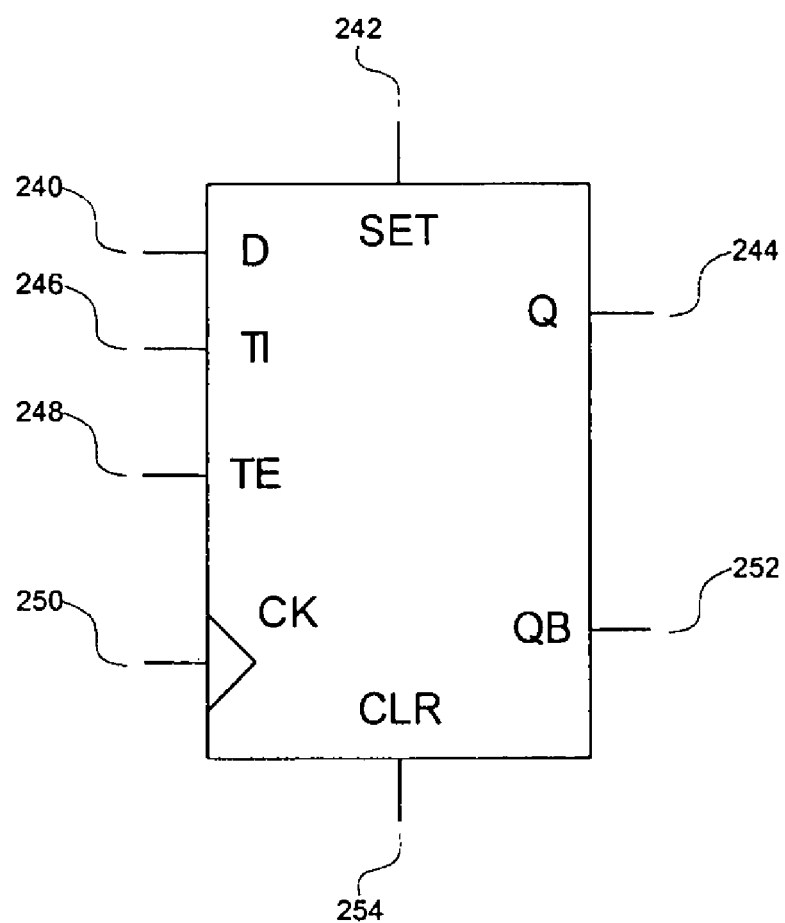
FIG. 8 shows a typical register with input and output pins.

Referring to FIG. 8, a typical register cell is shown. Register cells are predominantly used to implement the storage elements in digital systems. The register cell and its various input pins can be used as an example to illustrate a timing point connection rule that is the basis of building a timing point database.

The register shown in FIG. 8 has test scan support. Pin TE 248 is the test enabling control pin that switches the register between the test scan and the functional mode. Pin CK 250 is the input clock pin of the register, while pin SET 242 and pin CLR 254 are the set and reset function pins. The set and reset function pins 242 and 254 can either be synchronous or asynchronous. When active, the set and reset function pins 242 and 254 either set or reset the register value. In functional mode, data at data pin D 240 is sampled into the register when clock pin CK 250 is triggered and both set and reset pins are inactive. In scan mode, data at test input pin TI 246 is sampled when clock pin CK 250 is triggered. Pins Q 244 and QB 252 are the output pins reflecting the register value and its complement.

The timing point connection rule specifies the non-clock input pin or pins that are to be included in evaluating the connectivity between timing points in constructing the timing point frame for each timing point cell type. As will be further explained, connected arc attributes between timing points are then evaluated accordingly. A clock pin is always evaluated since it dictates the clocking domains.

Using the register in FIG. 8 as an example, if the connection rule specifies only that input pin D is to be considered, the constructed timing point frame evaluates connectivity to input pin D from the other timing point's output pins. Since pin D is the data input pin in functional mode, the constructed timing point frame reflects the functional operation mode of the design. If the timing point connection rule specifies that only input pin TI is used, the corresponding constructed timing point frame is the connectivity in the test scan operating mode. Therefore, each timing point frame is a disjoint reference to the entire design, and every single timing point can appear at most once and only once in any timing point frame. Similarly, timing point connection rules can be established for building timing point frames corresponding to test enable, set, reset functions or their combinations.

Figure 9A:
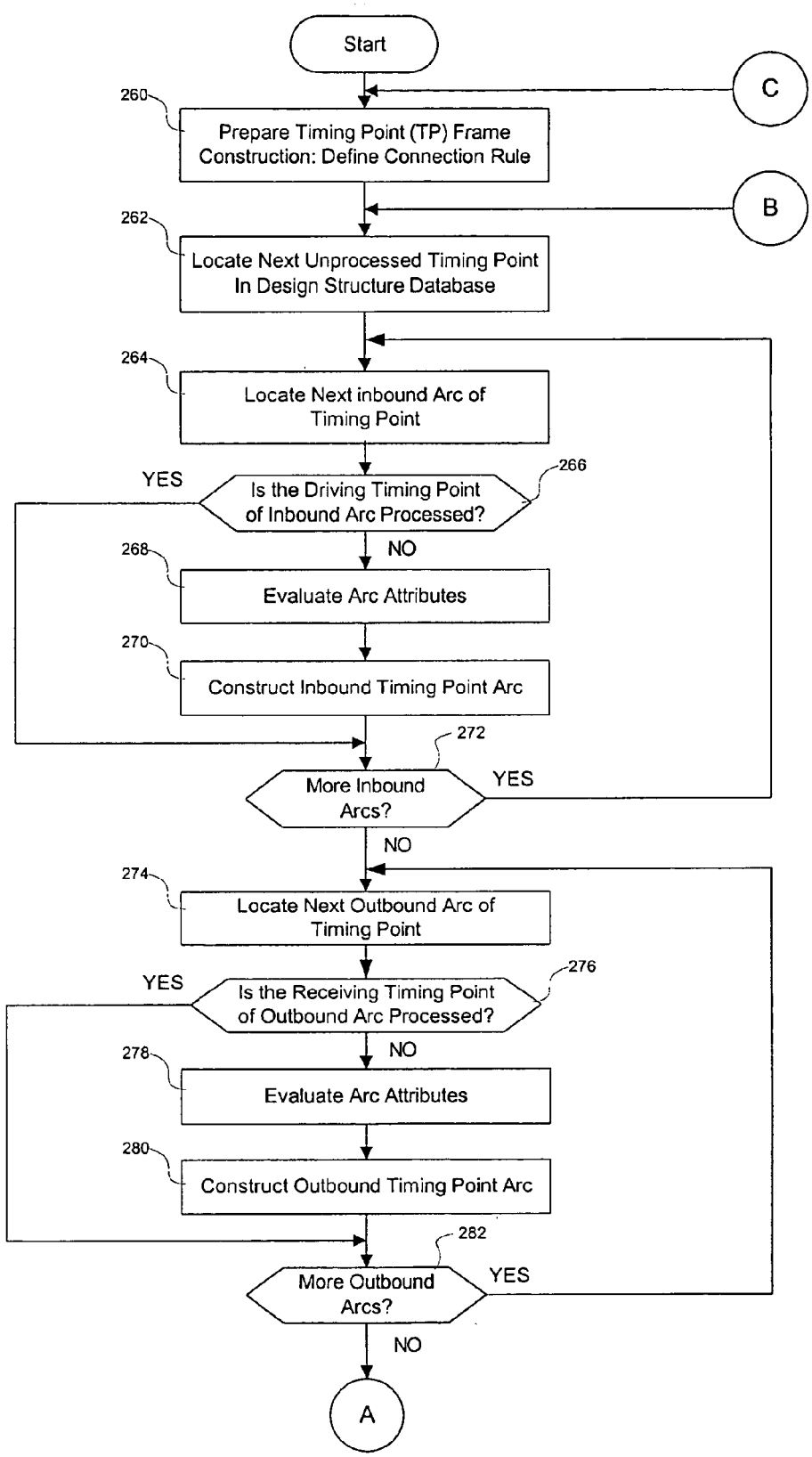
FIGS. 9A and 9B are a flowchart illustrating a step-by-step process of building timing point frames.
Figure 9B:
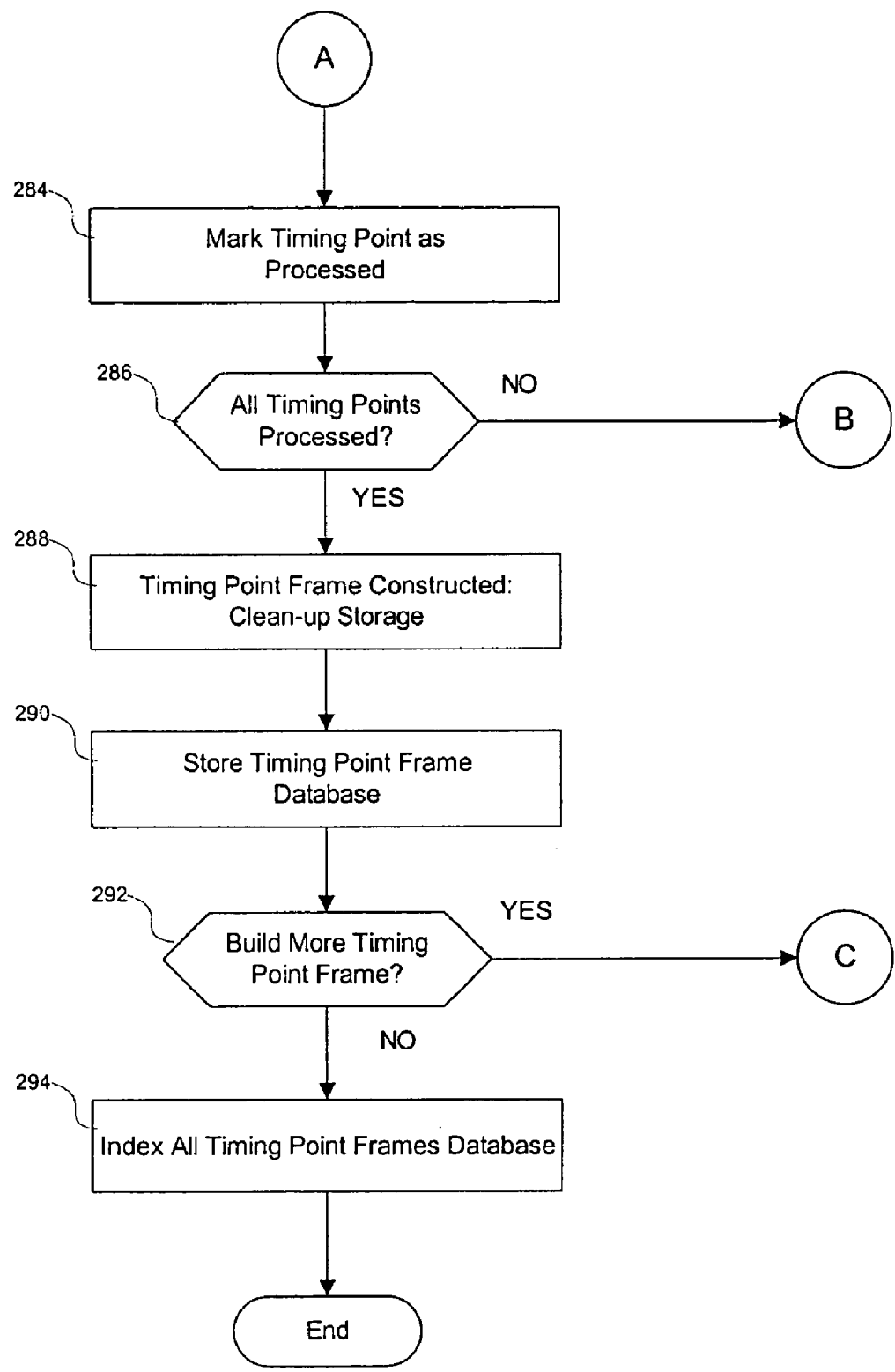

FIGS. 9A and 9B illustrate the steps for building the timing point database from step 190 of FIG. 6. The outcome of this processing stage is one or more timing point frames 192 in the in-core memory that are ready for timing point profile queries and checks 194 or for the next processing stage 196.

In step 260 of FIG. 9A, the timing point connection rule is defined and the design structure database 186 is prepared for timing point frame construction. Step 262 is the starting point of an iterating loop for processing all timing points one at a time in the design structure database 186. In step 262, the next unprocessed timing point in the design structure database is located and designated as being current.

Steps 264, 266, 268, 270 and 272 are an iterating loop that locate and process the driving timing points reachable to the input pin or pins of the current timing point as defined in the connection rule. Step 266 determines whether the driving timing point has been previously processed, and if not, a new inbound timing point arc is constructed linking these two timing point pairs. In steps 268 and 270, the evaluated arc attributes are then attached to the newly created timing point arc between the timing point pair. The arc attributes reflect the collapsed representation of all non-clocked cells in the path. The arc attributes can include the minimum and maximum level of cells, the timing delay between the timing point pair, or the various logical cone properties.

A similar process is employed in steps 274, 276, 278, 280 and 282 for the receiving timing points reachable from the current timing point. A respective timing point arc is built if the receiving timing point has not been previously processed. The corresponding timing point arc attributes are also evaluated and stored.

Referring to FIG. 9B, in steps 284 and 286, the current timing point is marked as processed. If there are more timing points to be processed, the process loops back to step 262 of FIG. 9A to begin another iteration. When all the timing points have been processed and all the timing point arcs have been evaluated and built, the timing point frame construction ends with a final clean up process of working storage in step 288. The newly completed timing point frame is allocated and stored in step 290. In step 292, the process checks to see if there are more timing point frames to be constructed and if so, then processing loops back to step 260. Otherwise all the completed timing point frames are indexed and stored in step 294.

Figure 10:
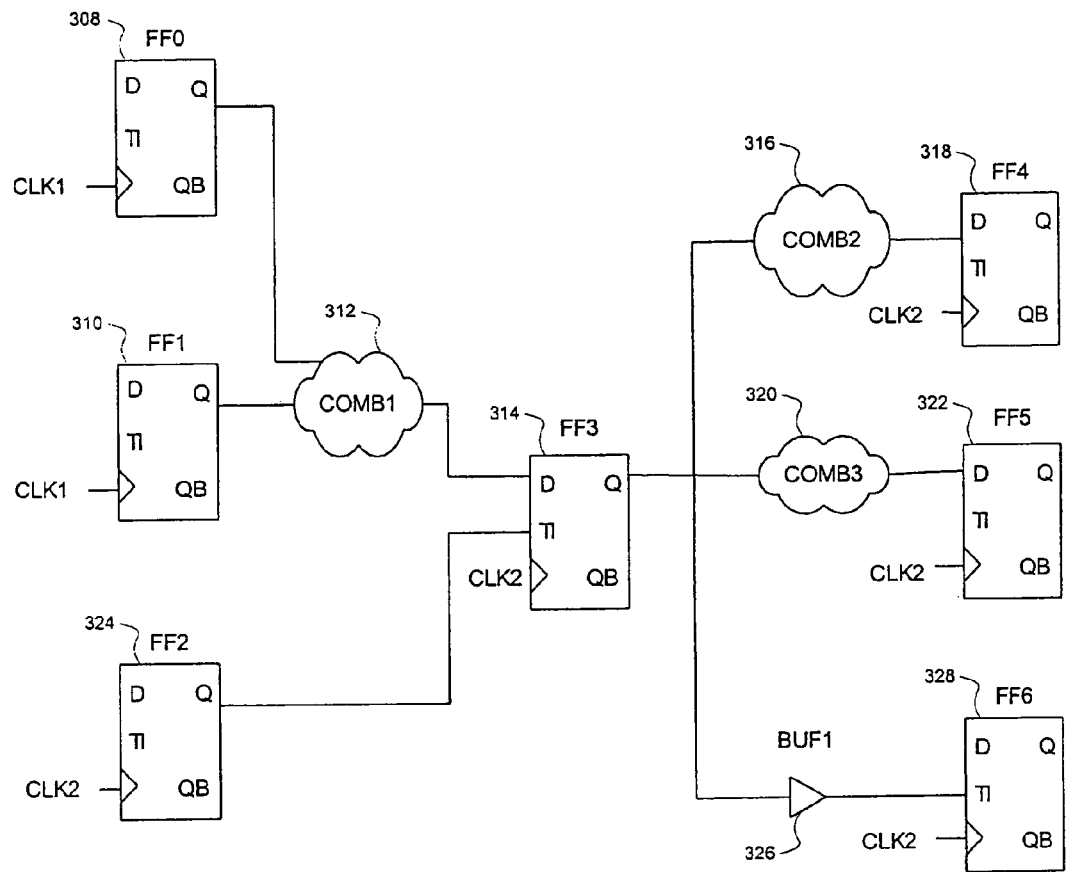
FIG. 10 is an example network from a gate level netlist specification illustrating the process of building a timing point database.

FIG. 10 is an example of a gate level netlist specification used to illustrate the construction of timing point frames with the typical register described in FIG. 8. The gate level netlist specification shown in FIG. 10 is a network of seven registers that are part of a larger design. There are two separate operating clock domains, CLK1 and CLK2. For illustrative purpose, only the design elements connected between these seven registers are shown.

Register FF0 308 and FF1 310 are triggered by clock CLK1. The remaining registers FF2 324, FF3 314, FF4 318, FF5 322 and FF6 328 are all triggered by clock CLK2. In FIG. 10, COMB1 312, COMB2 316 and COMB3 320 represent clusters of combinatorial cells with no storage capability and no clock pins and are therefore not timing points. Each cluster may have many levels of connected combinatorial cells with a number of re-convergent paths between the cluster's ports. BUF1 326 is a non-inverting buffer cell connected between the output of register FF3 314 and the TI pin of register FF6 328. The connected input pins of the seven registers FF0 308, FF1 310, FF2 324, FF3 314, FF4 318, FF5 322 and FF6 328 are either on pin D or pin TI. As previously described in FIG. 8, pin D is the data input pin of a register and pin TI is the scan test input data.

Figure 11:
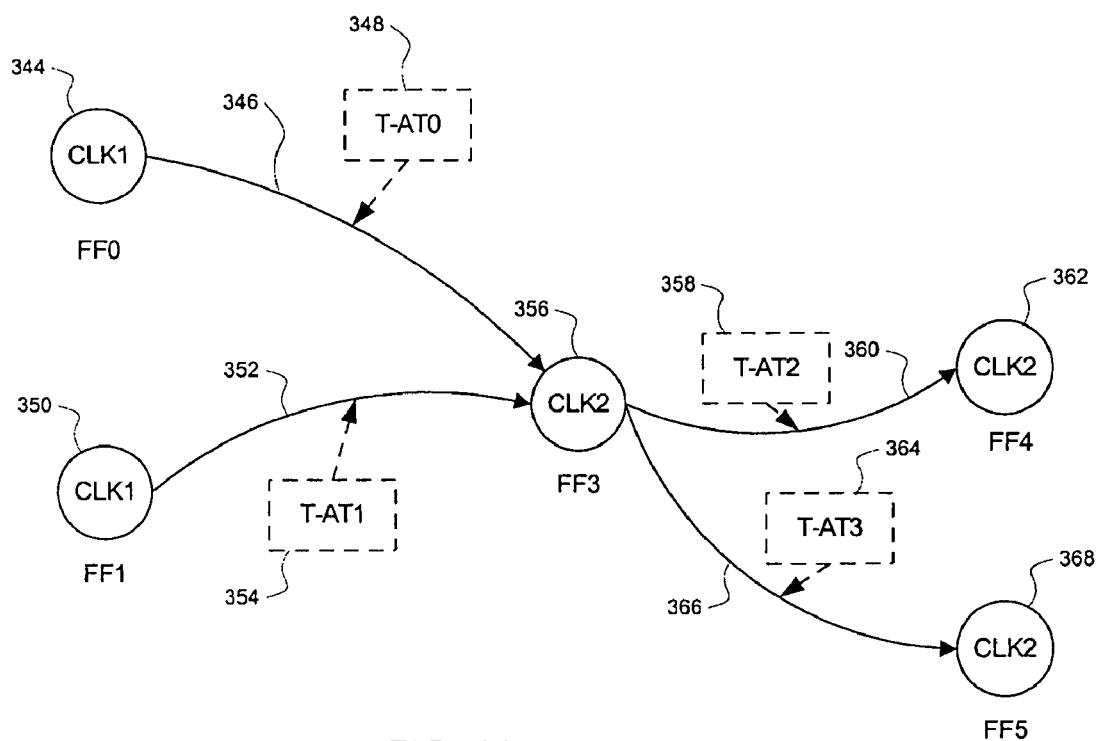
FIG. 11 is a graphical representation of a timing point frame constructed with a pin D connection rule and based on the gate level netlist specification shown in FIG. 10.

Continuing with the example shown in FIG. 10, a first timing point frame is constructed by selecting the timing point connection rule for only pin D of a register in the functional mode. Following through the steps outlined in FIGS. 9A and 9B, the result is a timing point frame database that is shown in FIG. 11. The attributes of the timing point arcs have been named with prefixed "T-AT" followed by a number.

As seen in FIG. 11, there are total of five timing points constructed for the above-described the timing point connection rule. The five timing points are FF0 344, FF1 350, FF3 356, FF4 362 and FF5 368, which correspond to the five registers involved in the pin D connection. The timing points are graphically represented as circular nodes with its corresponding clock domain labeled within the node. For instance, FF1 350 is a timing point in clock domain CLK1. It will be recognized that any shape can be used to represent the timing point.

The timing point arc between timing points is the collapsed representation of the connected combinatorial cells between the two timing points. The timing point arc signifies the connectivity relationship between the timing points and the characteristics of the connected paths are captured as the attributes of the timing point arc. For example, timing point arc 346 is connected between FF0 344 and FF3 356. The timing point arc 346 indicates that there are connectivity paths from the output of timing point FF0 344 into the input of FF3 356. The attributes of timing point arc are T-AT0 348. Similarly, timing point arc 352 captures the path from timing point FF1 350 to FF3 356, and is characterized with the attribute T-AT1 354. Hence, the cluster of combinatorial cells COMB 1 312 in FIG. 10 is been characterized by attributes T-AT0 348 and T-AT1 354 in the two separate timing arcs in this timing point frame. It will be recognized that any type of shape can be used to connect the timing points and that an arc is illustrative of just one type of shape.

The two timing point arcs between the timing point FF3 356 and its downstream timing points FF4 362 and FF5 368 are constructed in a similar way. In essence, T-AT2 358 are the attributes for timing point arc 358 that correspond to cluster COMB2 318.The attributes T-AT3 364 for timing point arc 364 correspond to cluster COMB3 320.

In summary, the timing point frame shown graphically in FIG. 11 is a reference frame for the gate level netlist specification represented in FIG. 10. The timing point frame for this example is constructed using a connection rule at only pin D of the registers, thus creating a level of representation corresponding to the functional operating mode of the design.

Figure 12:
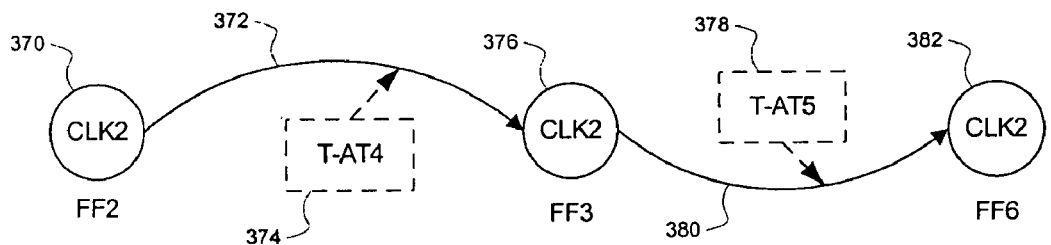
FIG. 12 is a graphical representation of a timing point frame constructed with a pin TI connection rule and based on the gate level netlist specification example shown in FIG. 10.

Referring to FIG. 12, another timing point frame is illustrated using another connection rule for the example shown in FIG. 10. In this example, the timing point connection rule is for pin TI. Because pin TI of the register is connected for the test scan operation, the timing point frame constructed for this rule reflects the test scan functional mode. FIG. 12 shows a graphical representation of the timing point frame for the test scan functional mode.

Specifically, in FIG. 12, three timing points are created, namely FF2 370, FF3 376 and FF6 382. These timing points correspond to the three registers involved with the connected input pin TI. The two timing point arcs 372 and 380 are also constructed according to this connection rule. Because there is no combinatorial cells between the output of register FF2 324 to the input pin TI of register FF3 314, the corresponding timing point arc 372 between the respective timing points FF2 370 and FF3 376 will have the value of zero for the minimum and maximum levels of cells in the timing point arc attribute T-AT4 374. Similarly, cell BUF1 326 is the only cell between register FF3 314 and register FF6 328. The values for the minimum and maximum levels of cells in the timing point arc attribute T-AT5 378 of the timing point arc 380 are 1.

Register FF3 314 has its timing point representation in both the timing point frames in FIG. 11 and FIG. 12. It is important to note that the timing point FF3 356 in FIG. 11 and the timing point FF3 376 in FIG. 12 have very different representations even though both originated from the same register FF3 314. Timing point FF3 356 in FIG. 11 represents the connectivity into input pin D, whereas timing point FF3 376 in FIG. 12 represents the connectivity into input pin TI.

Selected timing point frames can be used to generate a set of clock analysis views 198. Each clock analysis view contains a collection of timing point groups with the interactions between each group represented by directional group arcs. The timing points are clustered together based upon certain grouping rules. Each group arc captures the boundary conditions between two timing point groups and is characterized by a set of group arc attributes. Examples of the group arc attributes are the number of paths crossing the boundary and the number of boundary timing points at the driving and receiving side. The group arc attributes in the database provide linked references to underlying detailed timing points which can refer to cell elements in the gate level netlist specification. The clock analysis view can provide a hierarchical level of reference linkage that is capable of supporting a large number of design elements.

The grouping rule for the clock analysis view can typically involve clock domains. For instance, a grouping rule can be the clock domain of the timing points. Also, the level of design hierarchy can also be included as part of the grouping rule.

Figure 13A:
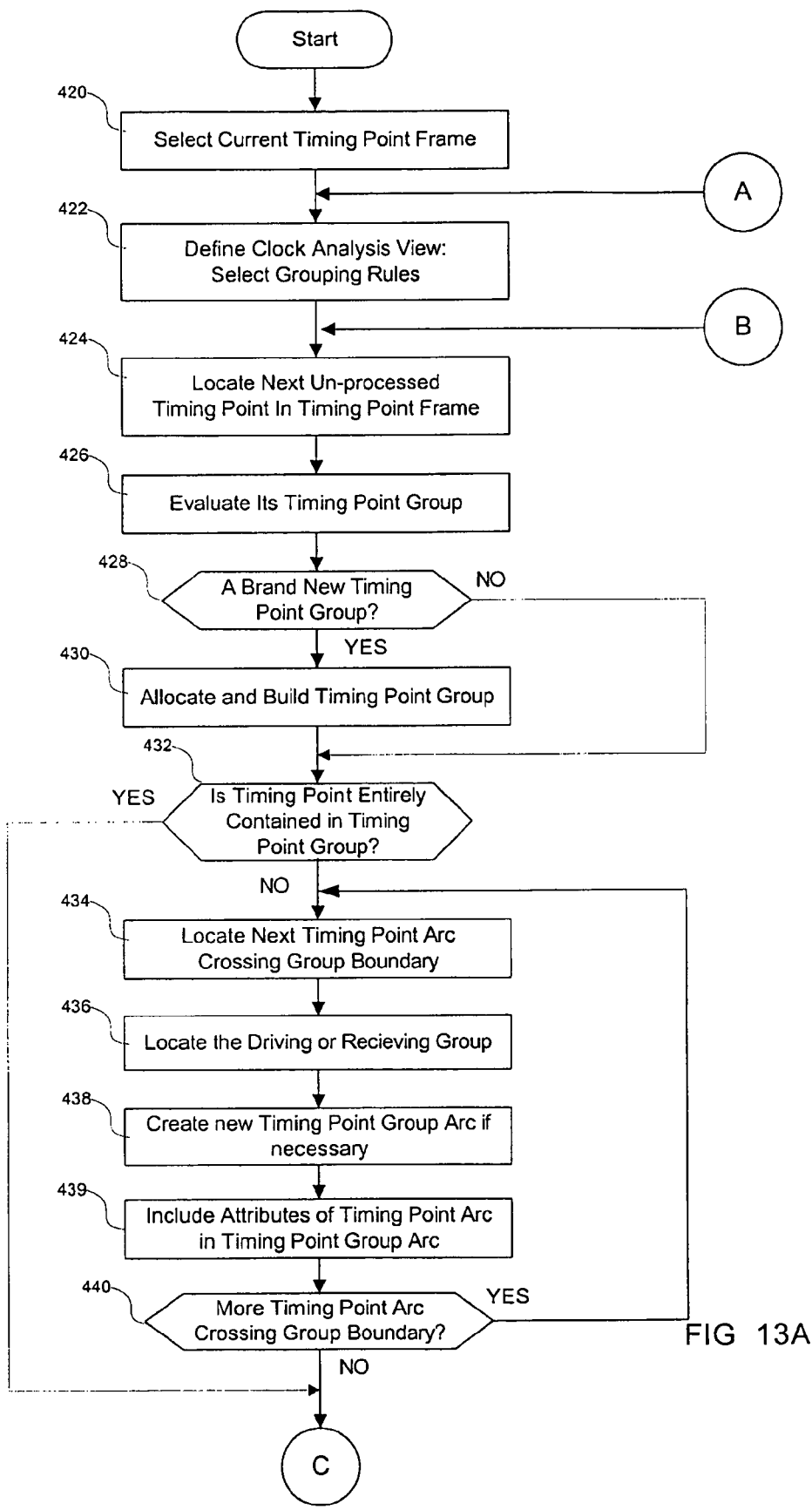
FIGS. 13A and 13B show the step-by-step process of building a clock analysis database.
Figure 13B:
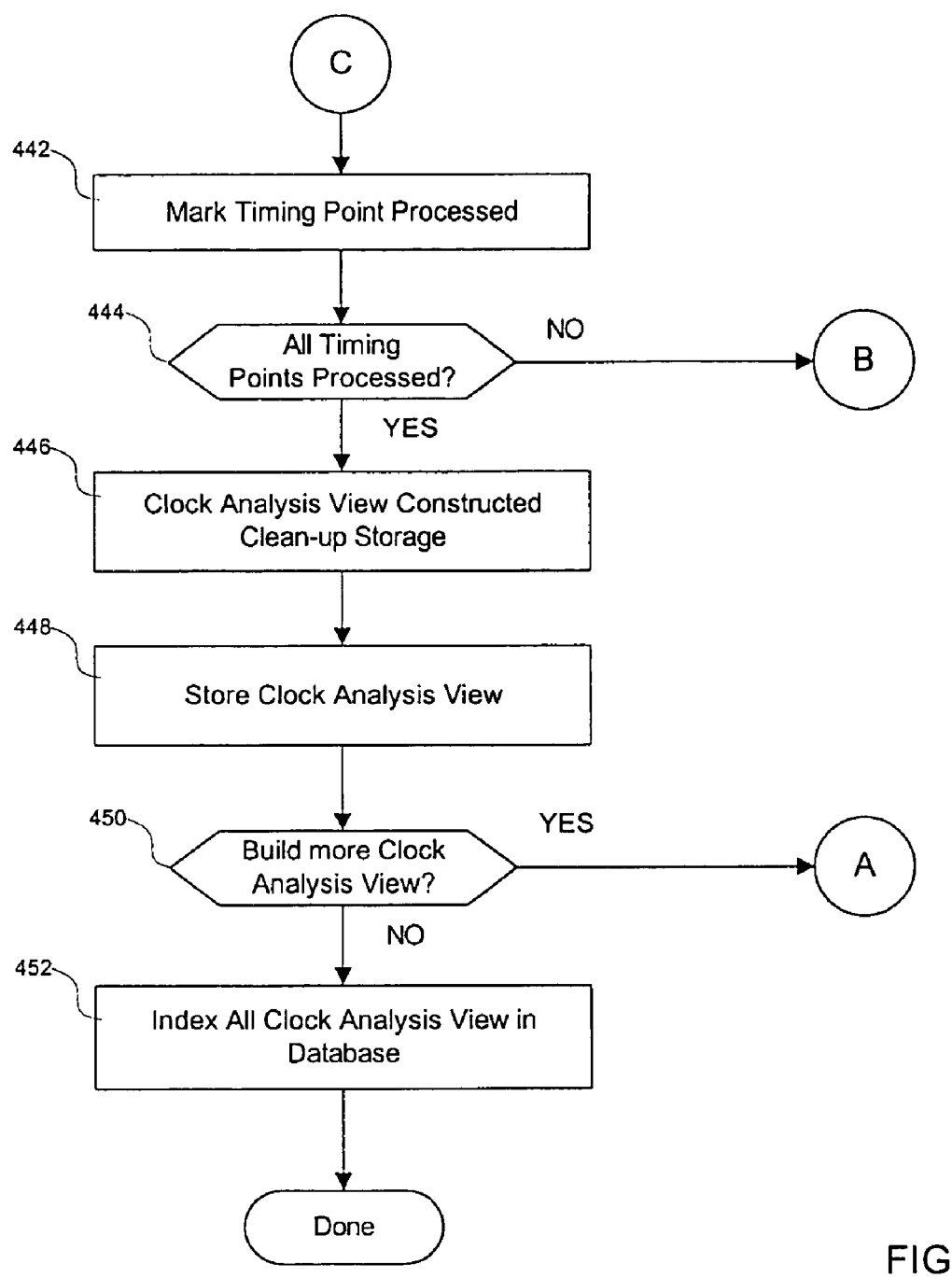

FIGS. 13A and 13B show the steps for building the clock analysis database performed in step 196 of FIG. 6. Referring to FIG. 13A, a timing point frame is selected in step 420 and is used as an input for generating the clock analysis view. Next in step 422, a grouping rule is established. All timing points in the selected timing point frame will be grouped according to this rule. In steps 424 and 426, the next unprocessed timing point in the timing point frame is selected and then its timing point group is evaluated. Steps 428 and 430 determine if this is a first timing point in a new group (step 428) and if so, a new timing point group is created in the clock analysis view database and the timing point is then assigned to this group (step 430).

In Step 432, the timing point is evaluated to determine if the timing point is at the boundary of its group or entirely contained in the timing point group. If the timing point is not entirely contained within the timing point group, then the next timing point arc crossing the group boundary is located in step 434. The timing point arc can either be an inbound timing point arc or an outbound timing point arc crossing the boundary. The corresponding timing point group at the other end of the timing point arc is identified in order to locate or create the respective timing point group arc in step 436. In step 438, a new timing point group arc is created if necessary. The attributes of the timing point arc are then merged into the timing point group arc in step 439. In step 440, it is determined if there are more timing point arcs crossing the group boundary. If there are more timing group arcs, then the process returns to step 434, otherwise the process proceeds to step 442 of FIG. 13B.

Referring to FIG. 13B, the processed timing point is marked in step 442. If there are more un-processed timing points, as determined in step 444, the processing returns to step 424. Otherwise, the generation of the clock analysis view is completed. In step 446, the working space is cleaned up and the necessary memory storage is allocated. The clock analysis view is then stored in the database in step 448. In step 450, it is determined whether more clock analysis views are to be built. If so, processing returns back to step 422. Otherwise, all required clock analysis views are completely built. In step 452, the clock analysis views are indexed for later reference.

Figure 14:
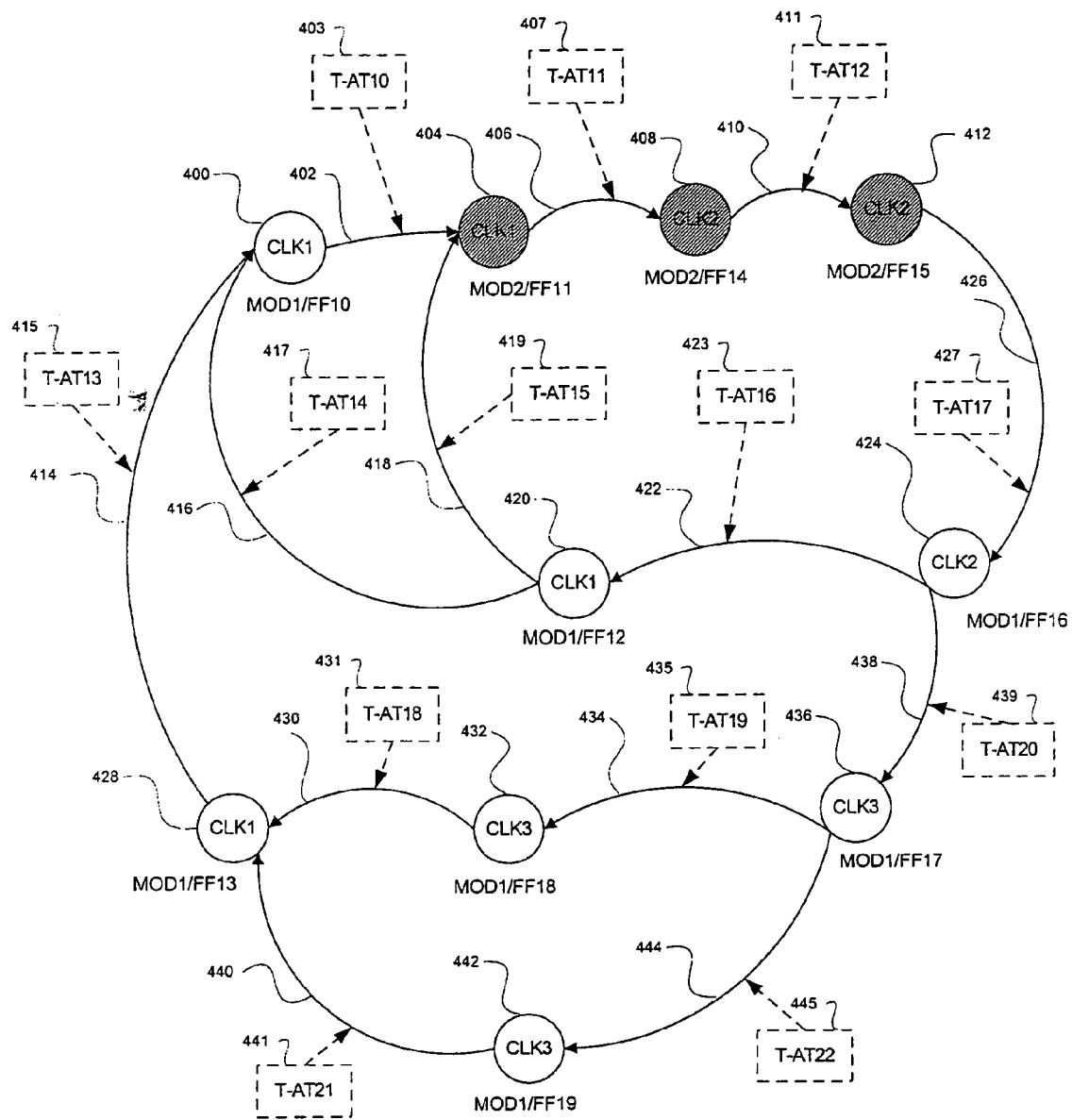
FIG. 14 is a graphical representation showing an example of a timing point frame to illustrate the building of a clock analysis view.

FIG. 14 is an example of a timing point frame and shows how the clock analysis view is constructed and how timing point arc attributes are transformed and collated into group arc attributes. There are total of 10 timing points and 13 timing point arcs in FIG. 14. Similar to the graphical symbols used previously, the timing point is represented as a circular node with its clock domain written inside. The node name is the hierarchical instance name of the cell element from which the timing point is derived and is a text string located right below the node (e.g., MOD1/FF10, MOD2/FF11, etc . . . ).

The hierarchical instance name reflects the level of hierarchies where the cell element is residing in the gate level netlist specification. For a physical gate level netlist, the hierarchical instance name also directly corresponds to the layout partitions. For example, timing point 400 has a hierarchical name MOD1/FF10 and is triggered by clock domain CLK1. The hierarchical name indicates that the cell element for the timing point is instance FF10 in the MOD1 module. According to the hierarchical names in FIG. 14, all timing points in the example are derived from cell elements in either the MOD1 module or MOD2 module. Specifically, timing points with the hash pattern are in the MOD2 module and are timing points MOD2/FF11 404, MOD2/FF14 408 and MOD2/FF15 412. The remaining seven timing points are all derived from cell elements in module MOD1 and are shown as white solid circular nodes. These timing points are MOD1/FF10 400, MOD1/FF12 420, MOD1/FF16 424, MOD1/FF13 428, MOD1/FF18 432, MOD1/FF17 436 and MOD1/FF19 442.

Each timing point arc characterizes the connectivity-based relationship between two timing points. The direction of the timing point arc indicates the direction of the logic signal flow from outputs of one timing point to the inputs of the other. The timing point arc attributes are graphically represented as dotted rectangles pointing to the respective timing point arc. With reference to FIG. 14, timing point arc 402 has an attribute set T-AT10 403, timing point arc 406 has an attribute set T-AT11 407, timing point arc 410 has an attribute set T-AT12 411 and so on.

Using the timing point frame example in FIG. 14 as an input, two separate clock analysis view databases can be constructed using two different grouping rules. It will be recognized, that different grouping rules can be used to create other clock analysis views. In the first example shown in FIG. 15, the timing point's own clock domain is used as the criteria for grouping. The attributes of all the timing point group arcs are named with prefix "G-AT" and are followed by a number. All timing points in the timing point frame example are either triggered by clock CLK1, CLK2 or CLK3. Thus three timing point groups are formed according to the grouping rule. Each group is graphically shown as an elliptical shape with the clock domain as the group name. Thus, the three timing point groups are CLK1 450, CLK2 464 and CLK3 460.

Each group arc is created when there is interaction between two timing point groups. The group arc attribute is a combined collection of attributes of all timing point arcs crossing between these two groups. A group arc can also be created from a timing point group to itself. This self-connected group arc is common and indicates that there are timing points in this group that are interacting with other timing points in the very same group. For example in FIG. 15, a self-connected group arc is group arc 452 for timing group CLK1 450 with the group arc attribute G-AT50 453. This group arc is a direct combination of all timing point arcs that have connected timing points in the same clock domain CLK1 (i.e., timing arcs 402, 414, 416 and 418 in FIG. 14). The resulting group arc attribute is the combined transformation of all of the attributes of the underlying timing point arcs. Specifically, group arc attribute G-AT50 453 in FIG. 15 is the result of a direct combination of timing arc attributes T-AT10 403, T-AT13 415, T-AT14 417 and T-AT15 419 from FIG. 14.

Similarly, for self connected group arc 468 of the timing point group CLK2 464, the group arc 468 and its attribute G-AT56 469 are the results of combining the timing point arcs 410 and 426, and their respective timing point arc attributes T-AT12 411 and T-AT17 427. Another example of a self-connected group arc is group arc 462 with attribute G-AT54 463 which is the result of combining timing point arcs 434 and 444 and combining respective timing point arc attributes T-AT19 435 and T-AT22 445.

For group arcs across different timing point groups, the building process is very similar. If there are underlying timing point arcs crossing from one timing point group to another timing point group, then a respective group arc is built. In FIG. 15, there are a total of 4 group arcs that cross between different timing point groups, namely group arcs 454, 456, 458 and 466. For instance, group arc 454 crosses from timing point group CLK3 460 to timing point group CLK1 450 and is derived from all timing point arcs crossing from timing points in clock domain CLK3 to the timing points in clock domain CLK1 (i.e., timing arcs 430 and 440 in FIG. 14). Thus the group arc attribute G-AT51 455 is generated by combining T-AT18 431 and T-AT21 441. Similarly, group arc 456 with attribute G-AT52 457 is derived from timing arc 406 with attribute T-AT11 407, which is the only timing point arc going from clock domain CLK1 to clock domain CLK2. The remaining two group arcs are built in a similar manner. Group arc 458 with attribute G-AT53 459 is derived from timing arc 422 with attribute T-AT16 423, which crosses from clock domain CLK2 to clock domain CLK1. Similarly, group arc 466 with attribute G-AT55 467 is derived from timing arc 438 with attribute T-AT20 439, which crosses from clock domain CLK2 to clock domain CLK3.

Figure 15:
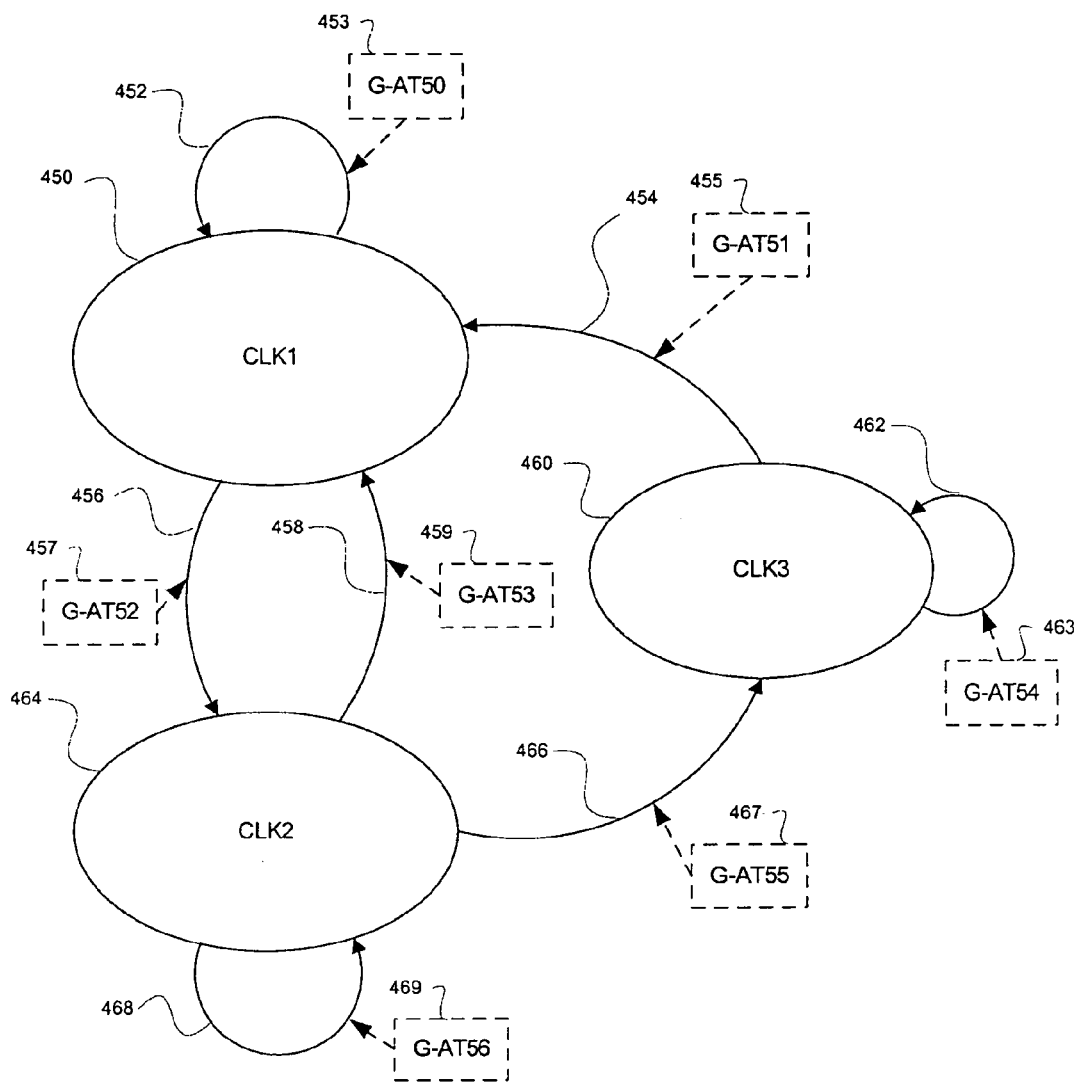
FIG. 15 is a graphical representation showing a clock analysis view constructed with a clocking domain grouping rule for the example shown in FIG. 14.

Using the grouping rule for the example shown in FIG. 15, the clock analysis view effectively captures and identifies the interactions between clock domains. Through the group arcs and their associated group arc attributes, the underlying timing point arcs and timing points at the boundary can be accessed down to the cell elements that correspond to the timing points. Thus, the clock analysis view presents a method for accessing the design objects and properties from a higher level of representation down to the lower level of cell elements.

Figure 16:
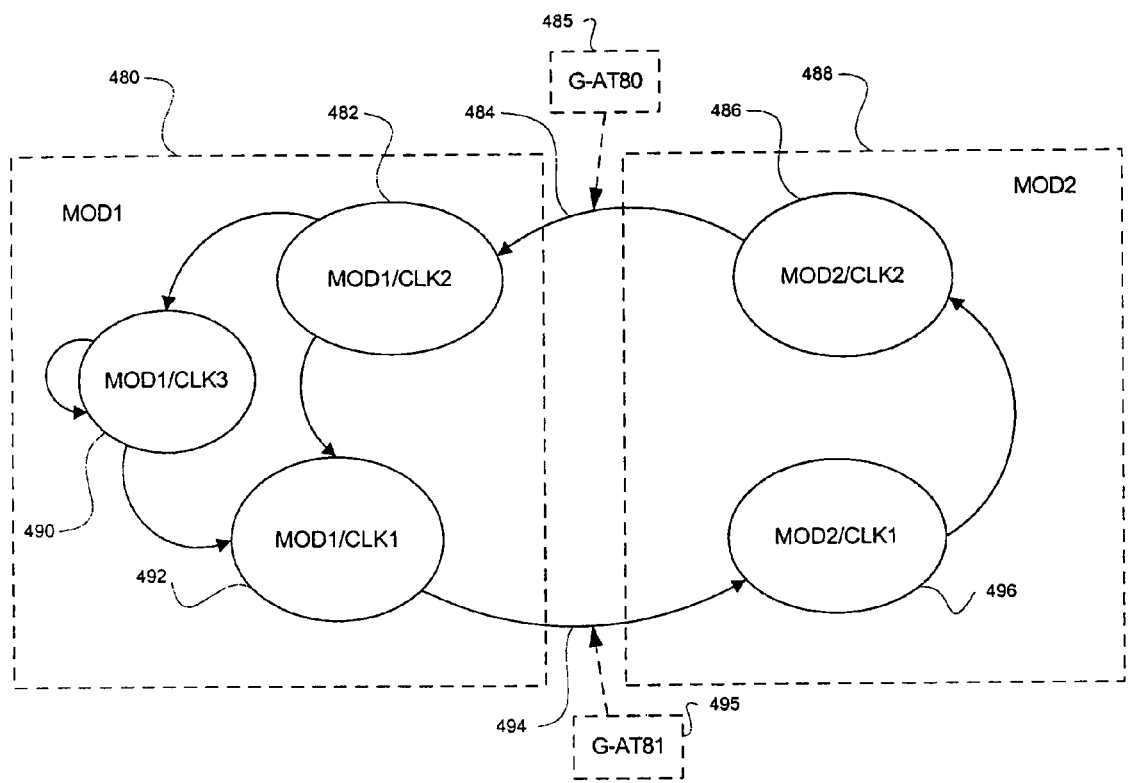
FIG. 16 is a graphical representation showing a clock analysis view constructed with both clocking domain and first level of hierarchies as grouping rules for the example shown in FIG. 14.

Referring to FIG. 16, a second example of a clock analysis view is shown using a more complicated grouping rule. In this example, two criteria are used for grouping; first by the first level of module hierarchy and secondly, by the timing point's clock domain.

As mentioned previously, there are two module hierarchies, namely MOD1 and MOD2 in the timing point frame shown in FIG. 14. Combined with the clock domains, five timing point groups are created. The names of the timing point groups are prefixed by the module hierarchy name to ensure uniqueness. The five timing point groups are MOD1/CLK2 482, MOD2/CLK2 486, MOD1/CLK3 490, MOD1/CLK1 492 and MOD2/CLK1 496.

In FIG. 16, the two module hierarchies, MOD1 480 and MOD2 488, are marked by a dotted box. The timing point groups within MOD1 and MOD2 are constructed similarly to the previous example shown in FIG. 15. The group arcs and the group arc attributes are derived in the same way. In order to simplify the diagram, the group arc attributes within the module hierarchies MOD1 480 and MOD2 488 are not shown.

FIG. 16 illustrates that there are two group arcs crossing the module hierarchy boundary, (i.e., group arcs 484 and 494, with respective attributes G-AT80 485 and G-AT81 495). Group arc 484 is the result of combining all the timing arcs crossing from module MOD2 488 to module MOD1 480, which correspond to only one timing point arc 426. Hence group arc attribute G-AT80 485 is derived from timing point arc attribute T-AT17 427. Group arc 494 is crossing the opposite direction, from module MOD1 480 to module MOD2 488 and corresponds to two timing point arcs 402 and 418 from FIG. 14. Consequently, the group arc attribute G-AT81 495 is the combination of timing point arc attributes T-AT10 403 and T-AT15 419.

In contrast to the example shown in FIG. 15, the grouping rule in FIG. 16 provides a means to analyze the interactions between module hierarchies MOD1 and MOD2, and also the interaction between clocking domains within the individual module hierarchy. The clock analysis view of FIG. 16 also indicates that the interaction from MOD2 to MOD1 occurs in clocking domain CLK2, whereas the opposite interaction from MOD1 to MOD2 occurs in clocking domain CLK1.

FIGS. 15 and 16 illustrate two examples of the clock analysis view representing two different references for the same timing point frame. By using different grouping rules, different types of boundary conditions can be highlighted and analyzed within the full design context.

The purpose of the clock analysis view is to create a succinct visual representation of the design where interacting clocks can be quickly identified and subsequently analyzed in a top-down manner. Each timing-point group in the clock analysis view represents a collection of timing points with common properties specified by the grouping rules. The interaction of timing point groups is derived from the underlying timing point arcs and is captured by the directed timing point group arcs. The semantic of the timing point group arcs are therefore dictated by its grouping rules.

The presence of timing point group arcs indicates that connectivity of data transfer exists between the two timing point groups. More precisely, connectivity exists between the timing points and hence the clocked cell elements that they represent in the two timing point groups. Conversely, the absence of timing point group arcs indicates that no connectivity of data transfer between the two timing point groups exists. More importantly, the timing points and hence the clocked cell elements that they represent have no connectivity paths for data transfer when a timing point group arc does not exist.

Referring back to FIG. 15, each timing-point group represents a collection of all timing points that have the same triggering clock (i.e., in the same clock domain). The basic information conveyed by this clock analysis view illustrates that there are three distinct clock domains CLK1 450, CLK2 460 and CLK3 464. The presence of the four timing point group arcs (454, 456, 458 and 466) connecting between the different timing point groups indicates that there are four cross-clock domain interactions. That is, connectivity exists for transfers between clock domains CLK3 to CLK1, clock domains CLK1 to CLK2, clock domains CLK2 to CLK1, and clock domains CLK2 to CLK3. The absence of timing point group arcs between different timing point groups indicate that there is no connectivity path for data transfer. For example, in FIG. 15 there is no connectivity for data transfer between clock domains CLK1 to CLK3 and CLK3 to CLK2. The self-connected timing group arcs 452, 462 and 468 are interpreted in the same manner.

The presence or absence of the timing group arcs are part of the basic checking for clock interaction rules. From the visual representation, a designer can quickly spot missing or extra clock interaction connectivity where the implementation might deviate from the original design intent. Hence, a further detailed analysis may be required.

Similarly for the clock analysis view in FIG. 16, the additional grouping criteria by layout hierarchies conveys extra basic information. Specifically, in FIG. 16, the presence of timing group arcs 484 and 494 indicate that the connectivity of data transfer between layout hierarchy (partition) MOD1 and MOD2 are in clock domain CLK1 and CLK2. Because data signals crossing the layout hierarchy (partition) tend to have longer timing delays due to the global physical routing of signals, longer signal delays impact the operating speeds of clock domain CLK1 and CLK2. Depending on the target operating speeds, the layout hierarchy might produce a potential performance bottleneck for clock domains CLK1 or CLK2 in the physical design phase.

The attributes of a timing point group arc capture the characteristics of the underlying timing point arcs. These attributes support the overall clock interaction analysis and are a basis to support the next level of detail and support more complex and comprehensive clock interaction rule checks and queries. Timing point group arcs, as described previously, provide the first level of check in terms of connectivity of data transfer between timing point groups. The attributes of the timing point group arcs further enhance the checks and query capability to the level of detail associated with the mechanism of data transfer.

For example, typical attributes of a timing point group arc can include the list of underlying timing point arcs that contribute to the timing point group arc. Additionally, the attributes can include a list of transmitting and receiving timing points of the underlying timing point arcs. The receiving timing points can further be evaluated to determine if synchronizer techniques have been deployed. Furthermore, the attributes can include the longest and shortest timing point arcs, these can be in terms of level of logic gates or the actual timing delays.

Attribute values can be used to support more detailed rule checks. Specifically, the size (bus width) and length (in level of logics or delays) of signals crossing the clock domain can be an attribute value. Another attribute value can be the number of signals crossing clock domains that have synchronizers at the receiving end or the number of signals without synchronizers at the receiving end. The designer can therefore use these attribute values to verify the intended clock interaction schemes in the design.

The attributes of a timing point group arc can also provide a reference link to access cell level information. The reference link can support a top-down type of analysis. For example, through the attribute values, each timing point group arc allows access to all the underlying timing point arcs. Each of underlying timing point arcs allow access to the timing points that are connected. From each timing point, all the upstream or downstream timing points and connected timing point arcs can be accessed. Thus, the attributes of a timing point group arc can provide a means for traversing the timing points in a timing point frame. Each timing point maintains a link to the represented clocked cell element thereby allowing access to the cell element level.

The ability to support a top-down type of the analysis is extremely useful for a designer. For example, if a designer is not certain why a connectivity timing point group arc exists between two timing point groups, the designer can access down to the corresponding cell elements to determine if a true error has indeed occurred with the attribute values.

There are two ways the designer can interface with the clock interaction analysis: (1) overall rule checking and (2) interactive query. With overall rule checking, the design is verified against a pre-determined set of clock interaction rules. This is a pass-fail type of analysis. The analysis results can indicate if the clock interaction analysis has passed or failed. A summary of detected errors can be generated to alert the designer to problem areas. The interactive query provides an interface for stepping through the design analysis in a top-down manner. It allows the designer to examine individual attributes in real time, and also provides a means to explore the sources of the errors in greater detail.

An example of a clock interaction analysis will now be explained using the clock analysis view of FIG. 15. In the design corresponding to FIG. 15, assume that the data transfer between clock domains is only as follows: CLK1 to CLK2, CLK2 to CLK3 and CLK3 to CLK1. However, the timing point group arc 458 in the clock analysis view of FIG. 15 indicates that there is a connectivity path for data transfer from clock domain CLK2 to CLK1. This connectivity path violates the above-prescribed clock domain crossing rules because the rules do not allow for a transfer from CLK2 to CLK1. This type of error would be obvious to the designer just by viewing the clock analysis view.

In order to rectify the connectivity path, assume that the clock-domain crossing rule has been defined for the rule checking process in the clock interaction analysis. An error would be flagged in the analysis report indicating a violation of rules for arc 458. The analysis report may list the number of paths originating from the clock domain CLK2 to CLK1 which is essentially the number of timing point arcs contained in timing point group arc 458.

In order to further diagnose the problem, the designer can also switch to the interactive query for further analysis. In the interactive query, the designer can examine the list of paths crossing the clock domain boundary through the attribute set associated with the timing point group arc 458. The designer can also identify the timing points in the clock domain CLK1 receiving a data transfer from CLK2. These timing points are essentially the timing points at the end of the timing point arcs which represent the clock domain crossing paths. The cell elements represented by the receiving timing points can be identified, along with more specific information (e.g., the connecting pin of these cells, the hierarchical reference name which reflects the hierarchical module, the clock pins, etc). The designer can examine the associated detailed information to determine the cause of the errors.

Another example of an error that can be detected is where a module in the design has an erroneous connected clock that was intended to operate in clock domain CLK3 and was mistakenly connected to clock domain CLK1. Once the cause is located, the designer can devise a fix for this functional error. If a change in register transfer level (RTL) specification is needed, then the designer would proceed to make the necessary changes and continue with the next design iteration.

Additional modifications and improvements of the present invention may also be apparent to those of ordinary skill in the art. For example, other visual representations of the timing analysis views may be possible while still conveying the basic information. Thus, the particular combination of parts described and illustrated herein is intended to represent only certain embodiments of the present invention, and are not intended to serve as limitations of alternative devices within the spirit and scope of the invention.

The invention claimed is:

1. A method for generating a visualization of timing and clock relationships between circuit elements of a circuit design, the method comprising the following steps:
   (a) generating a database of timing points by analyzing a timing network and clock attributes of the circuit elements and recording respective characteristics thereof;
   (b) defining a timing point connection rule for the defining evaluation of connectivity to the between timing points;
   (c) analyzing the database of timing points to link the timing points according to the timing point connection rule;
   (d) generating a timing point frame by creating timing point connections between the timing points according to the timing point connection rule;
   (e) defining a clock analysis rule for grouping the timing point connections and timing points of the timing point frame;
   (f) analyzing the timing point frame according to the clock analysis rule in order to group the timing points and timing point connections; and
   (g) generating a clock analysis view by creating connections between the groups of timing points and timing point connections from the timing point frame to thereby provide a succinct visual representation of clock interactions between circuit elements according to the clock analysis rule.

2. The method of claim 1 wherein the stop of generating the database of timing points is performed by analyzing the timing network and clock attributes of a logical gate level netlist of the circuit design.

3. The method of claim 2 wherein the step of analyzing the timing network and clock attributes of the logical gate level netlist further comprises identifying clocked coil elements and non-clocked cell elements of the circuit design.

4. The method of claim 1 wherein the step of generating the database of timing points is performed by analyzing the timing network and clock attributes of a physical gate level netlist of the circuit design.

5. The method of claim 4 wherein the step of analyzing the timing network and clock attributes of the physical gate level netlist is performed by identifying clocked cell elements and non-clocked cell elements of the circuit design.

6. The method of claim 1 wherein the step of defining the timing point connection rule is performed by determining a common criteria for the timing point connections.

7. The method of claim 6 wherein the common criteria represents an operating mode of the circuit design.

8. The method of claim 7 wherein the operating mode is a normal functional mode of the circuit design.

9. The method of claim 7 wherein the operating mode is a test scan mode of the circuit design.

10. The method of claim 9 wherein the operating mode is a set/reset mode of the circuit design.

11. The method of claim 1 wherein the database of timing points has clocked cell elements and non-clocked cell elements and the step of analyzing the database of timing points is performed by abstracting the non-clocked cell elements according to the timing point connection rule.

12. The method of claim 11 further comprising the step of selectively collapsing according to the timing point connection rule the non-clocked cell elements into attribute references.

13. The method of claim 12 wherein the timing point connection rule is an operating mode of the circuit design.

14. The method of claim 13 wherein the operating mode is a functional mode of the circuit design.

15. The method of claim 13 wherein the operating mode is a test scan mode of the circuit design.

16. The method of claim 13 wherein the operating mode is a set/reset mode of the circuit design.

17. The method of claim 1 wherein the step of generating the timing point frame is performed by creating directed timing point arcs between the timing points that show tho direction of timing interactions.

18. The method of claim 17 wherein the step of analyzing the database of timing points further comprises generating a set of attribute references based upon the timing point connection rule and the step of generating the timing point frame further comprises creating timing point arcs with the attribute references.

19. The method of claim 18 wherein the stop of generating the timing point frame further comprises collapsing the attribute references and the timing points into the directed timing arcs that connect the timing points.

20. The method of claim 1 wherein the stop of defining the clock analysis rule fur grouping the timing points comprises determining a common criteria for grouping the timing points and the timing point connections of the timing point frame.

21. The method of claim 20 wherein the step of determining the common criteria comprises selecting a common clock domain for grouping the timing points and the timing point connections of the timing point frame.

22. The method of claim 20 wherein the step of determining the common criteria comprises selecting common hierarchies for grouping the timing points and the timing point connections of the timing point frame.

23. The method of claim 1 wherein the step of analyzing the timing point frame comprises determining interactions between timing point connections according to tho clock analysis rule.

24. The method of claim 23 wherein the step of determining interactions between timing point connections comprises finding a boundary of the timing point connections in the timing point frame and determining the timing point connections that cross the boundary.

25. The method of claim 24 further comprising the step of collapsing timing point connections that cross the boundary into group arc references.

26. The method of claim 25 wherein the step of generating the clock analysis view is performed by creating connections between the groups of timing points with the group arc references.

27. A method for generating a visualization of timing and clock relationships between circuit elements in a circuit design, the method comprising the following steps:
 (a) generating a database of timing points by analyzing the timing network and clock attributes of the circuit elements and recording respective characteristics thereof;
 (b) defining a timing point connection rule for defining evaluation of connectivity to the between timing points;
 (c) analyzing the database of timing points to link the timing points according to the timing point connection rule; and
 (d) generating a timing point frame by creating timing point connections between the timing points according to the timing point connection rule in order to provide a succinct visual representation of clock interactions between the circuit elements according to the timing point connection rule.

28. The method of claim 27 wherein the step of generating the database of timing points is performed by analyzing the timing network and clock attributes of a logical gate level netlist of the circuit design.

29. The method of claim 28 wherein the step of analyzing the timing network and clock attributes of the logical gate level netlist is performed by identifying clocked cell elements and non-clocked cell elements of the circuit design.

30. The method of claim 27 wherein the step of generating the database of timing points is performed by analyzing the timing network and clock attributes of a physical gate level netlist of the circuit design.

31. The method of claim 30 wherein the step of analyzing the timing network and clock attributes of the physical gate level netlist is performed by identifying clocked cell elements and non-clocked cell elements of the circuit design.

32. The method of claim 27 wherein the step of defining the timing point connection rule is performed by determining a common criteria for the timing point connections.

33. The method of claim 32 wherein the common criteria represents an operating mode of the circuit design.

34. The method of claim 33 wherein the operating mode is a normal functional mode of the circuit design.

35. The method of claim 33 wherein the operating mode is a test scan mode of the circuit design.

36. The method of claim 33 wherein the operating mode is a set/reset mode of the circuit design.

37. The method of claim 27 wherein the database of timing points has clocked coil elements and non-clocked cell elements and the stop of analyzing the database or timing points is performed by abstracting the non-clocked cell elements according to the timing point connection rule.

38. The method of claim 37 wherein the step of analyzing the database of timing points is performed by selectively collapsing the non-clocked cell elements into attribute references according to the timing point connection rule.

39. The method of claim 38 wherein the timing point connection rule is an operating mode of the circuit design.

40. The method of claim 39 wherein the operating mode is a functional mode of the circuit design.

41. The method of claim 39 wherein the operating mode is a test scan mode of the circuit design.

42. The method of claim 39 wherein the operating mode is a set/reset mode of the circuit design.

43. The method of claim 27 wherein the step of generating the timing point frame is performed by creating directed timing point arcs between the timing points that show the direction of timing interactions.

44. The method of claim 43 wherein the step of analyzing the database of timing points further comprises generaling a set of attribute references based upon the timing point connection rule and the step of generating the timing point frame further comprises creating timing point arcs with the attribute references.

45. The method of claim 44 wherein the step of generating the timing point frame further comprises collapsing the attribute references and the timing points into the directed timing arcs that connect the timing points.

* * * * *